United States Patent
Talebi Fard et al.

(10) Patent No.: US 10,805,983 B2
(45) Date of Patent: Oct. 13, 2020

(54) CONTROL PLANE DATA TRANSMISSION

(71) Applicants: Peyman Talebi Fard, Sterling, VA (US); Esmael Dinan, McLean, VA (US); Kyungmin Park, Herndon, VA (US); Weihua Qiao, Herndon, VA (US)

(72) Inventors: Peyman Talebi Fard, Sterling, VA (US); Esmael Dinan, McLean, VA (US); Kyungmin Park, Herndon, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 23 days.

(21) Appl. No.: 16/156,314

(22) Filed: Oct. 10, 2018

(65) Prior Publication Data
US 2019/0116631 A1   Apr. 18, 2019

Related U.S. Application Data
(60) Provisional application No. 62/573,304, filed on Oct. 17, 2017.

(51) Int. Cl.
  *H04W 80/10* (2009.01)
  *H04W 76/12* (2018.01)
  (Continued)

(52) U.S. Cl.
  CPC ............. *H04W 80/10* (2013.01); *H04W 8/08* (2013.01); *H04W 60/00* (2013.01); *H04W 68/02* (2013.01);
  (Continued)

(58) Field of Classification Search
  CPC ....... H04W 8/08; H04W 60/00; H04W 68/02; H04W 76/10; H04W 76/11; H04W 76/12;
  (Continued)

(56) References Cited

U.S. PATENT DOCUMENTS

| | | | |
|---|---|---|---|
| 2015/0023281 A1 | 1/2015 | Wu | |
| 2018/0199398 A1* | 7/2018 | Dao | ................ H04W 76/10 |
| 2019/0116229 A1* | 4/2019 | Shi | ................ H04W 76/34 |

OTHER PUBLICATIONS

3GPP TS 22.261 V15.1.0 (Jun. 2017); Technical Specification; 3rd Generation Partnership Project; Technical Specification Group Services and System Aspects; Service requirements for the 5G system; Stage 1 (Release 15).

(Continued)

*Primary Examiner* — Khoa Huynh
(74) *Attorney, Agent, or Firm* — David Grossman; Kavon Nasabzadeh; Philip Smith

(57) ABSTRACT

A session management function (SMF) receives a first message from an access and mobility management function (AMF). The first message indicates a request to configure a first session for a wireless device via the SMF and the AMF. The first message comprises: a first identifier of the first session; and a parameter indicating data transfer over control plane. the SMF selects a user plane function (UPF) based on the first message. The SMF sends a second message to the UPF to indicate a request to configure a second session between the SMF and the UPF. The second message comprises: a second identifier of the second session; and the parameter indicating data transfer over control plane. The SMF receives uplink data from the AMF via the first session and sends the uplink data to the UPF via the second session.

20 Claims, 19 Drawing Sheets

(51) Int. Cl.
*H04W 8/08* (2009.01)
*H04W 60/00* (2009.01)
*H04W 68/02* (2009.01)
*H04W 76/11* (2018.01)
*H04W 84/04* (2009.01)
*H04W 92/24* (2009.01)

(52) U.S. Cl.
CPC ............ *H04W 76/11* (2018.02); *H04W 76/12* (2018.02); *H04W 84/042* (2013.01); *H04W 92/24* (2013.01)

(58) Field of Classification Search
CPC ..... H04W 76/15; H04W 76/20; H04W 76/34; H04W 80/10; H04W 84/042; H04W 92/24
See application file for complete search history.

(56) References Cited

OTHER PUBLICATIONS

3GPP TS 23.401 V15.0.0 (Jun. 2017); Technical Specification; 3rd Generation Partnership Project; Technical Specification Group Services and System Aspects; General Packet Radio Service (GPRS) enhancements for Evolved Universal Terrestrial Radio Access Network; (E-UTRAN) access (Release 15).

3GPP TS 23.501 V1.4.0 (Sep. 2017); Technical Specification; 3rd Generation Partnership Project; Technical Specification Group Services and System Aspects; System Architecture for the 5G System; Stage 2; (Release 15).

3GPP TS 23.502 V1.2.0 (Sep. 2017); Technical Specification; 3rd Generation Partnership Project; Technical Specification Group Services and System Aspects; Procedures for the 5G System; Stage 2; (Release 15).

3GPP TS 23.682 V15.2.0 (Sep. 2017); Technical Specification; 3rd Generation Partnership Project; Technical Specification Group Services and System Aspects; Architecture enhancements to facilitate communications with packet data networks and applications; (Release 15).

3GPP TR 24.890 V1.0.3 (Sep. 2017); Technical Report; 3rd Generation Partnership Project; Technical Specification Group Core Network and Terminals; 5G System—Phase 1; CT WG1 Aspects (Release 15).

3GPP TS 29.274 V15.1.0 (Sep. 2017); Technical Specification; 3rd Generation Partnership Project; Technical Specification Group Core Network and Terminals; 3GPP Evolved Packet System (EPS); Evolved General Packet Radio Service (GPRS); Tunnelling Protocol for Control plane (GTPv2-C); Stage 3; (Release 15).

3GPP TS 36.413 V14.3.0 (Jun. 2017); Technical Specification; 3rd Generation Partnership Project; Technical Specification Group Radio Access Network; Evolved Universal Terrestrial Radio Access Network; (E-UTRAN); S1 Application Protocol (S1AP); (Release 14).

3GPP TS 38.413 V0.3.0 (Aug. 2017); Technical Specification; 3rd Generation Partnership Project; Technical Specification Group Radio Access Network; NG Radio Access Network; (NG-RAN); NG Application Protocol (NGAP) (Release 15).

TSG RAN WG3 chairman Mr. Gino Masini (Ericsson) opened the meeting 3GPP TSG RAN WG3 #97 on Monday Aug. 21, 2017 at 9am.

R3-172720; 3GPP TSG-RAN3 Meeting #97; Berlin, Germany, Aug. 21-25, 2017; Title: Early Data transmission in CP solution; Source: Huawei; Agenda item: 13.1; Document for: Discussion.

R3-173056; 3GPP TSG-RAN WG3 Meeting #97; Berlin, Germany, Aug. 21-25, 2017.

R3-173401; 3GPP TSG-RAN WG3 Meeting #97; Berlin, Germany Aug. 21-25, 2017; Title: LS on UE differentiation of NB-IOT; Release: Rel-15; Work Item: NB_IOTenh2-Core.

RP-171428; (revision of RP-170852); 3GPP TSG RAN Meeting #76; West Palm Beach, USA, Jun. 5-8, 2017 (revision of RP-170852); Source: Huawei, HiSilicon; Title: Revised WID on Further NB-IoT enhancements.

RP-171428; revision of RP-170852); 3GPP TSG RAN Meeting #76; West Palm Beach, USA, Jun. 5-8, 2017; Source: Huawei, HiSilicon; Title: Revised WID on Further NB-IoT enhancements.

S2-175923; (revision of S2-17xxxx); 3GPP TSG|WG-SA2 Meeting #122-bis; Sophia Antipolis, France, Aug. 21-25, 2017; Source: Huawei, HiSilicon, Neul; Title: WID on Further CIoT enhancements.

S2-176690; 3GPP TSG-SA WG2 Meeting #122bis; Sophia Antipolis, France, Aug. 21-25, 2017 (e-mail revision 1 of S2-176070); Title: LS on no dedicated bearer support over NB-IoT.

S2-176865; SA WG2 Meeting #S2-123; Oct. 23-27, 2017, Ljubljana, Slovenia; 3GPP TSG CT WG 3 Meeting 91 C3-174370; 3GPP TSG CT WG 4 Meeting 79 C4-174343; Krakow (Poland), Aug. 21-25, 2017; Title: LS on Conclusion on Service Based Architecture Protocol Selection.

* cited by examiner

Receive, by an SMF from an UPF, a 1st message indicating a request for establishment of a 1st session for transmission of downlink data for a wireless device, the 1st message comprising an identifier of the 1st session
1810

Send, by the SMF to an AMF, a 2nd message indicating a request for establishment of a 2nd session for transmission of the downlink data, the 2nd message comprising an identifier of the 2nd session
1820

Receive by the SMF from the UPF, the downlink data
1830

Send by the SMF to the AMF, the downlink data
1840

FIG. 18

```
┌─────────────────────────────────────────────────────────────────┐
│  Receive, by an AMF from a wireless device, a request to establish │
│   a NAS connection via a base station, the request indicating that │
│   the NAS connection is for data transmission over a control plane │
│                              1910                                  │
└─────────────────────────────────────────────────────────────────┘
                                  │
                                  ▼
┌─────────────────────────────────────────────────────────────────┐
│  Receive, by the AMF from the wireless device, a NAS message, the │
│  NAS message comprising: uplink data; and an indicator for control │
│                     plane data transmission                        │
│                              1920                                  │
└─────────────────────────────────────────────────────────────────┘
                                  │
                                  ▼
┌─────────────────────────────────────────────────────────────────┐
│   Select by the AMF and in response to receiving the NAS message, │
│                              a NEF                                 │
│                              1930                                  │
└─────────────────────────────────────────────────────────────────┘
                                  │
                                  ▼
┌─────────────────────────────────────────────────────────────────┐
│   Send, by the AMF to the NEF, a 1st message indicating a request │
│ to configure a 1st session for the wireless device between the AMF │
│ and the NEF, the 1st message comprising: the indicator for control │
│           plane data transmission; and an identifier of the NEF    │
│                              1940                                  │
└─────────────────────────────────────────────────────────────────┘
                                  │
                                  ▼
┌─────────────────────────────────────────────────────────────────┐
│   send, by the AMF to the NEF, the uplink data via the 1st session │
│                              1950                                  │
└─────────────────────────────────────────────────────────────────┘
```

FIG. 19

CONTROL PLANE DATA TRANSMISSION

CROSS-REFERENCE TO RELATED APPLICATIONS

This application claims the benefit of U.S. Provisional Application No. 62/573,304, filed Oct. 17, 2017, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 18 is an example flow diagram illustrating an aspect of an embodiment of the disclosure.

FIG. 19 is an example flow diagram illustrating an aspect of an embodiment of the disclosure.

DETAILED DESCRIPTION OF EMBODIMENTS

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
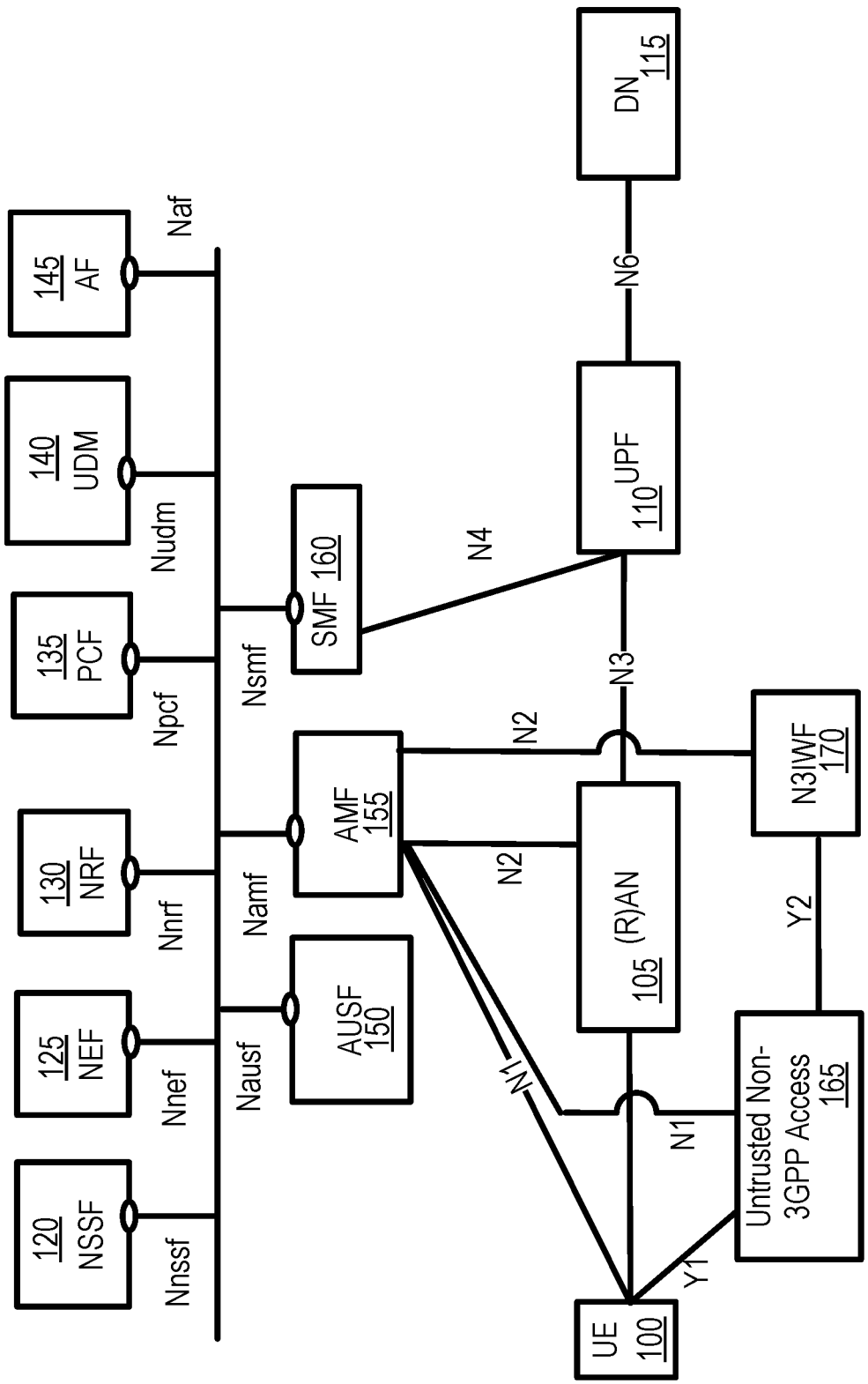
FIG. 1 is a diagram of an example 5G system architecture as per an aspect of an embodiment of the present invention of the disclosure.
Figure 2:
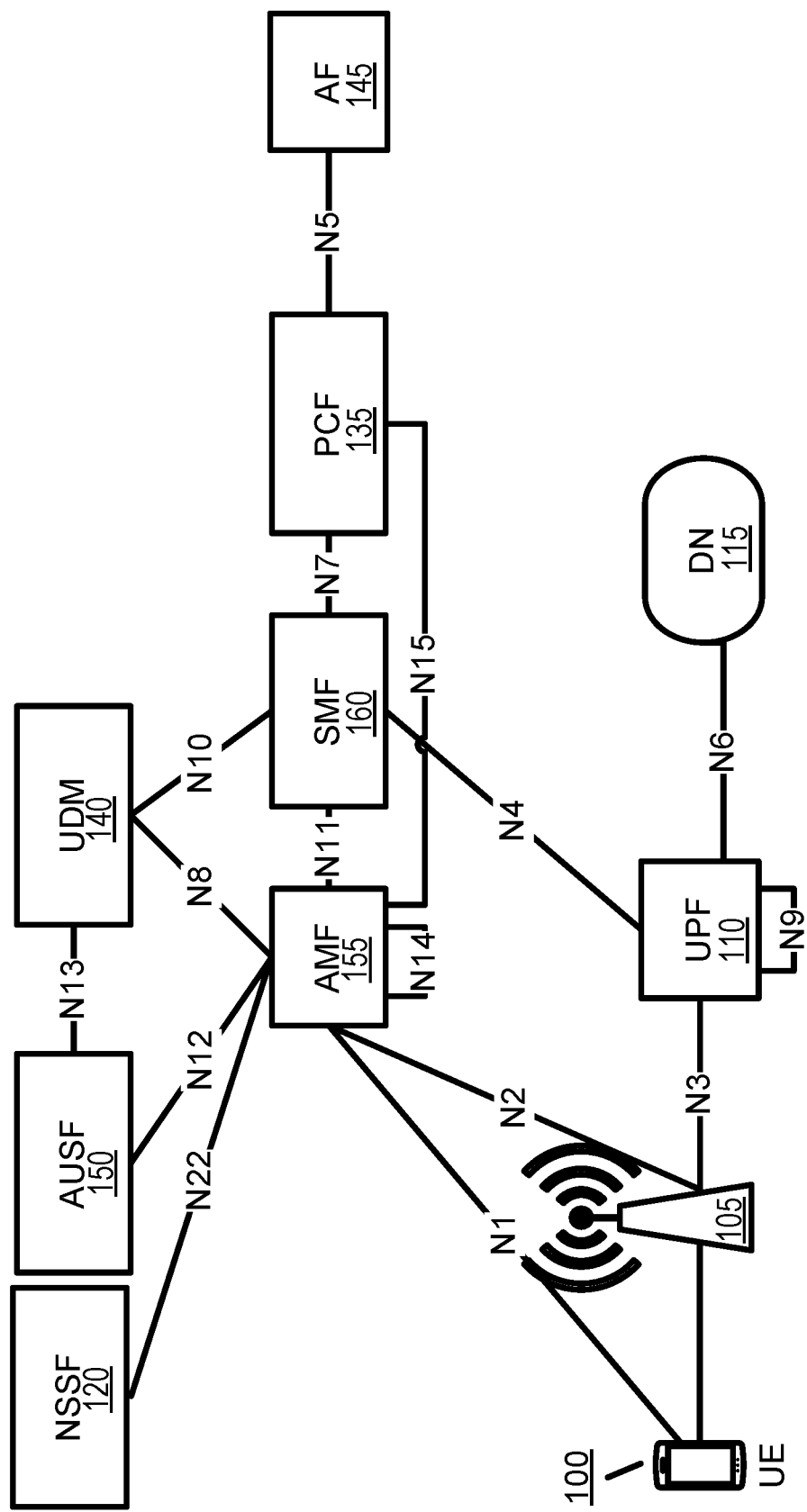
FIG. 2 is a diagram of an example 5G System architecture as per an aspect of an embodiment of the present invention of the disclosure.

The following acronyms are used throughout the present disclosure:
5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GTP GPRS Tunneling Protocol
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet Data Unit
PEI Permanent Equipment Identifier
PLMN Public Land Mobile Network
RAN Radio Access Network
QFI QoS Flow Identity
RM Registration Management
51-AP 51 Application Protocol
SBA Service Based Architecture
SEA Security Anchor Function
SCM Security Context Management
SMF Session Management Function
SMSF SMS Function
S-NSSAI Single Network Slice Selection Assistance information
SUPI Subscriber Permanent Identifier TEID Tunnel Endpoint Identifier
UE User Equipment
UL Uplink
UL CL Uplink Classifier
UPF 110 User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
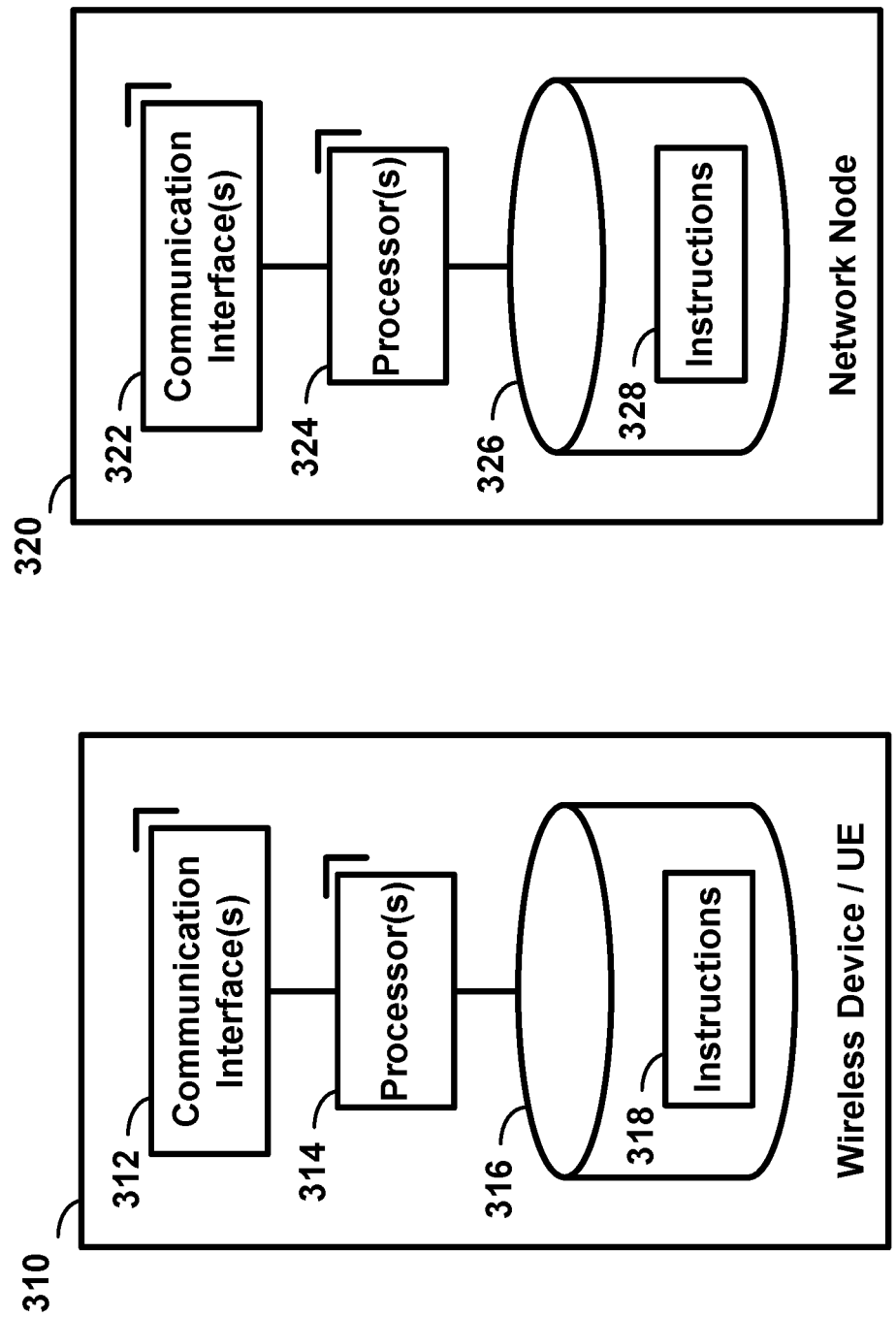
FIG. 3 is a system diagram of an example wireless device and a network node in a 5G system as per an aspect of an embodiment of the disclosure.
Figure 4:
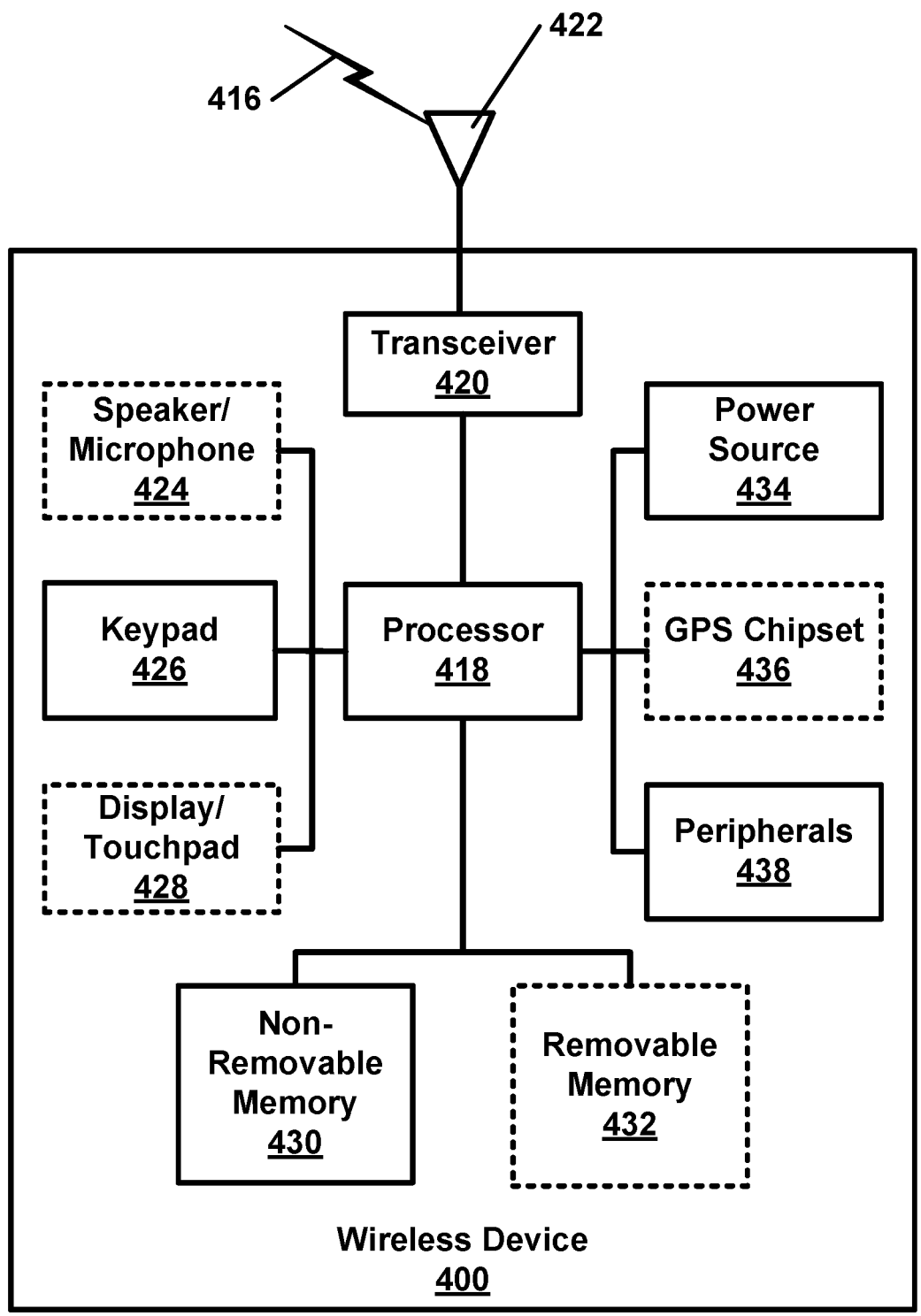
FIG. 4 is a system diagram of an example wireless device as per an aspect of an embodiment of the disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS, lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may also provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may also be employed once PDU session is established. IPv6 prefix allocation may be supported via IPv6 stateless autoconfiguration, if IPv6 is supported. IPv6 parameter configuration via stateless DHCPv6 may also be supported.

The 5GC may support the allocation of a static IPv4 address and/or a static IPv6 prefix based on subscription information in the UDM 140 or based on the configuration on a per-subscriber, per-DNN basis.

User plane function(s) (UPF 110(*s*) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
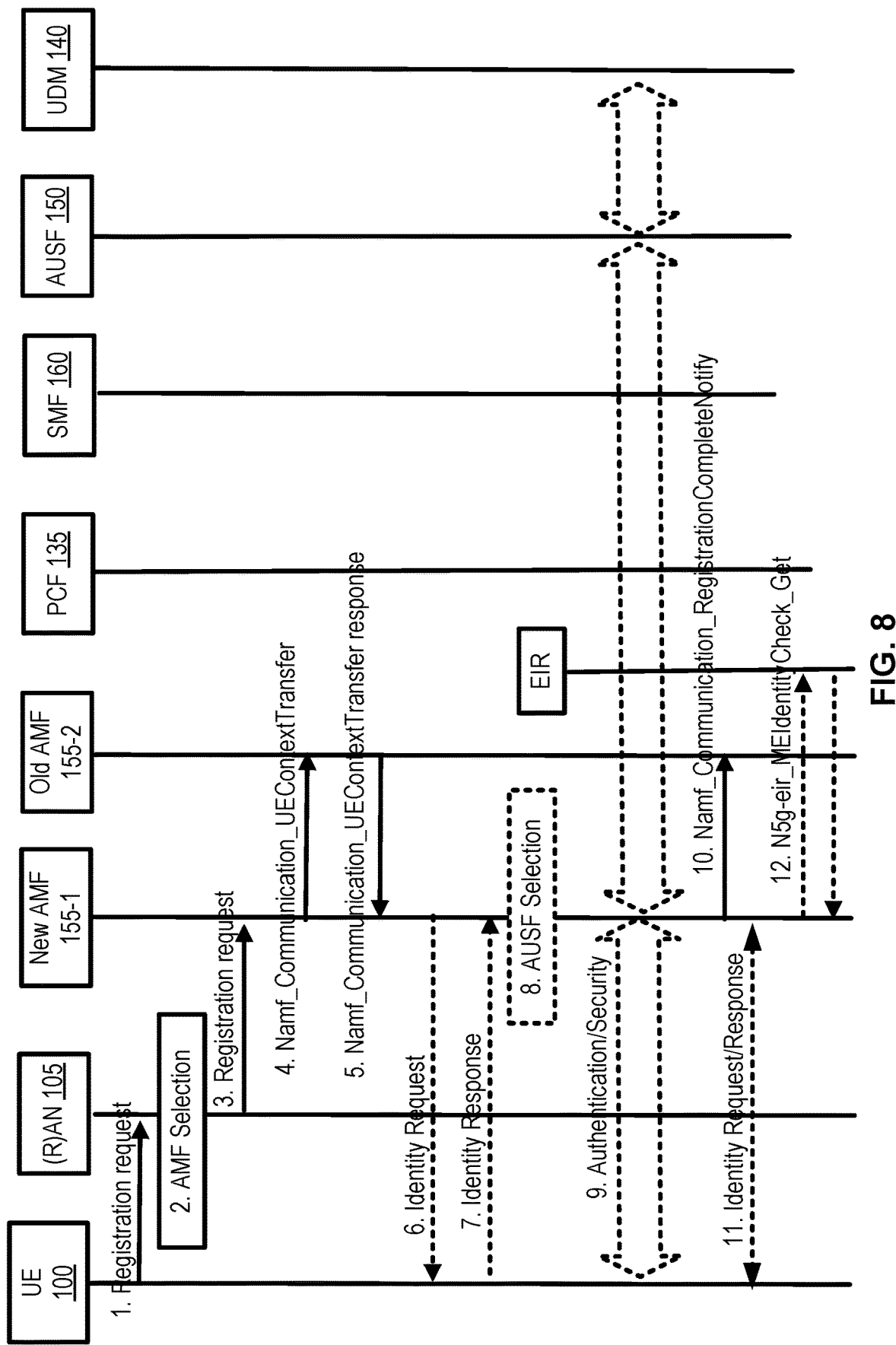
FIG. 8 and FIG. 9 are example call flow diagrams illustrating an example aspect of an embodiment of the disclosure.
Figure 9:
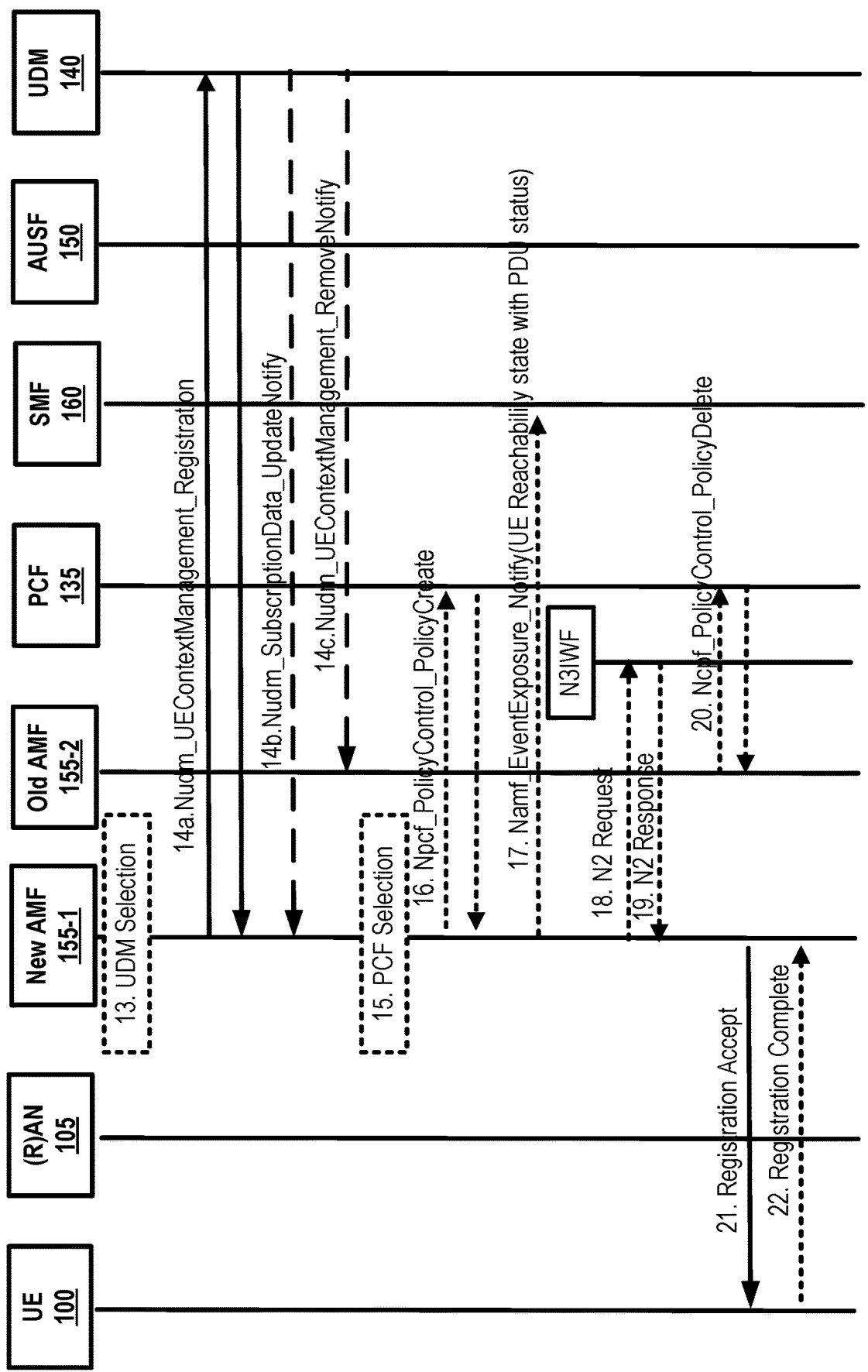

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

Figure 5:
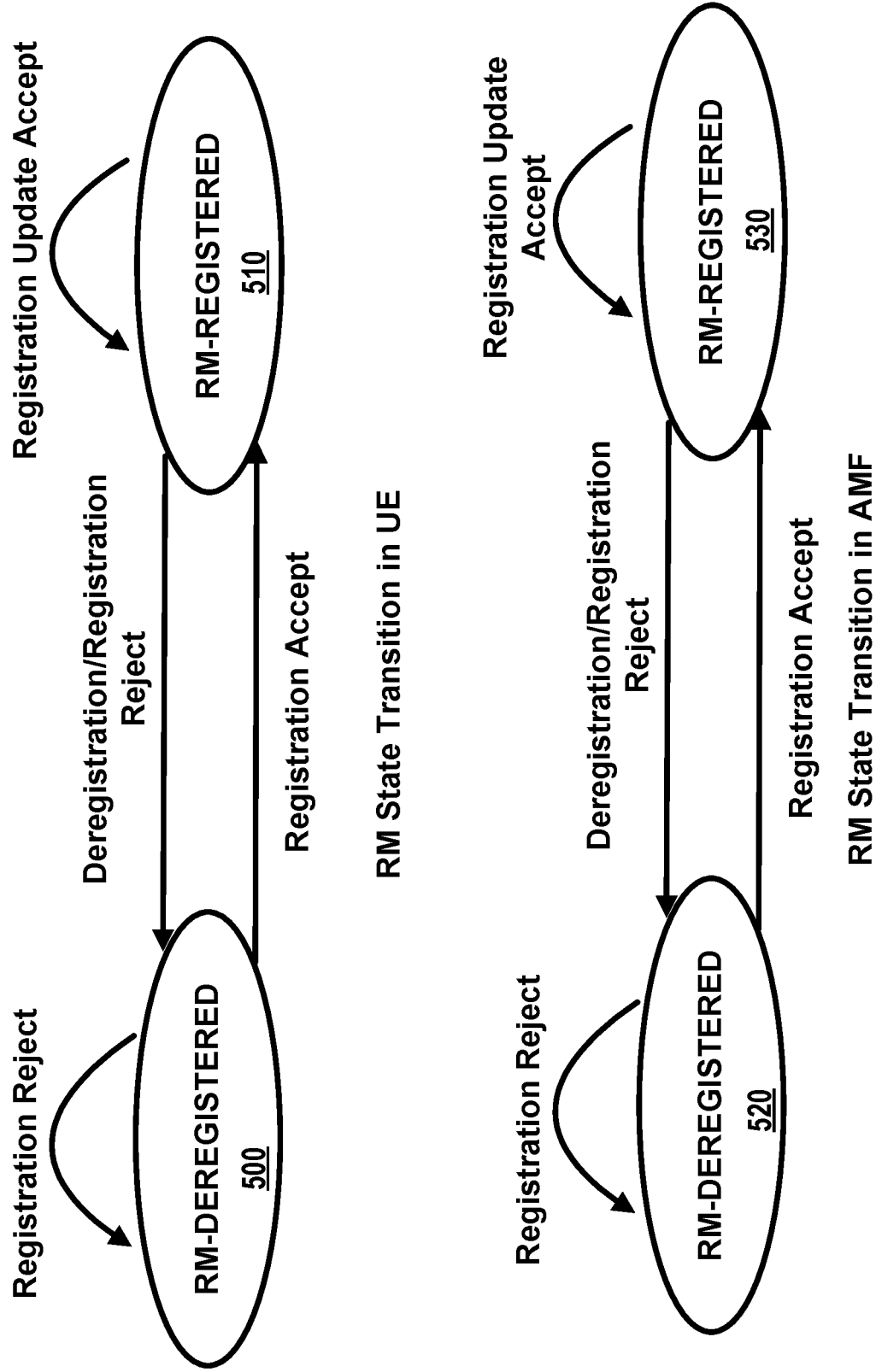
FIG. 5 is a diagram illustrating two registration management state models as per an aspect of an embodiment of the disclosure.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6:
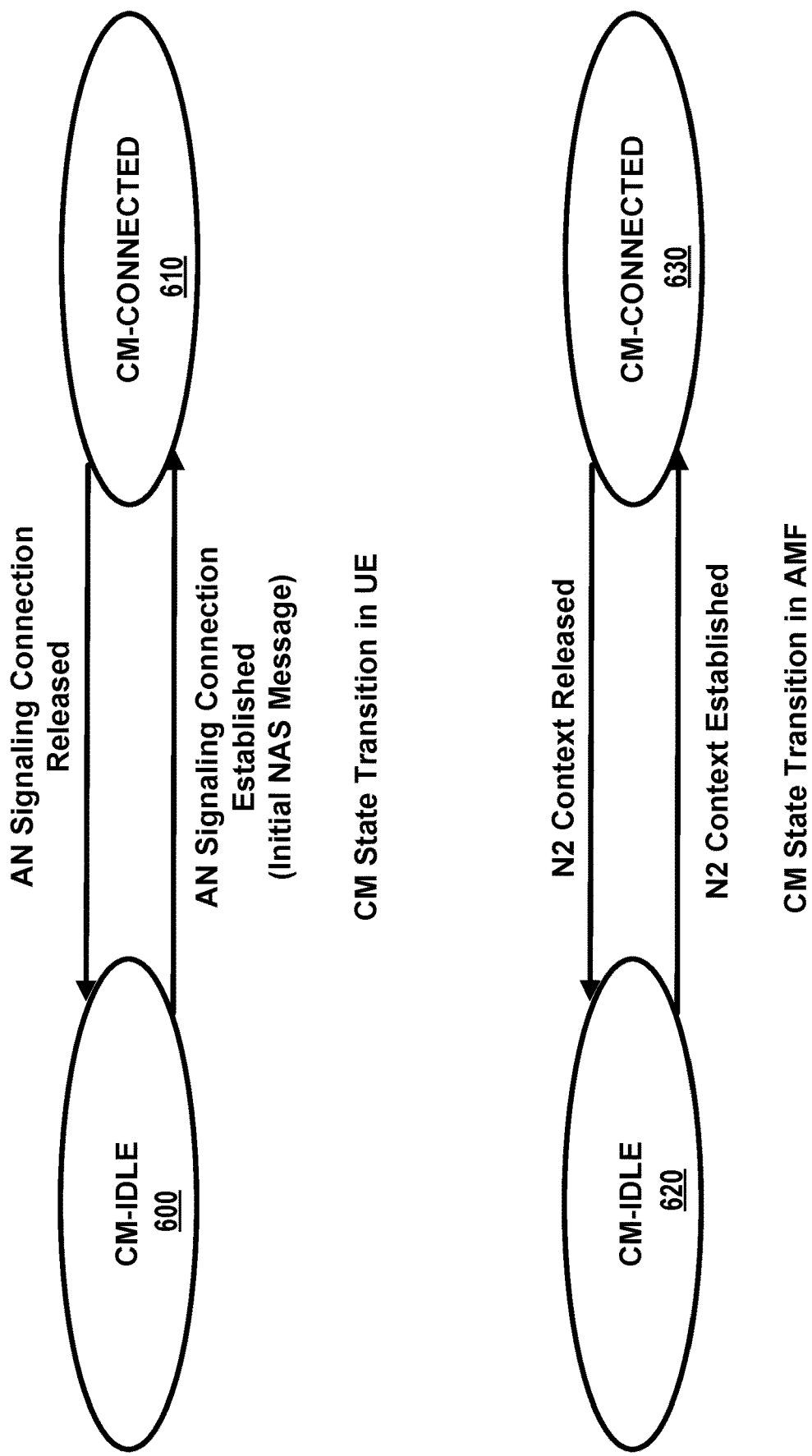
FIG. 6 is a diagram illustrating connection management state models as per an aspect of an embodiment of the disclosure.

As shown in example FIG. 6, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish the NAS signaling connection for a UE 100 in CM-IDLE 600 state. The procedure of releasing the NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
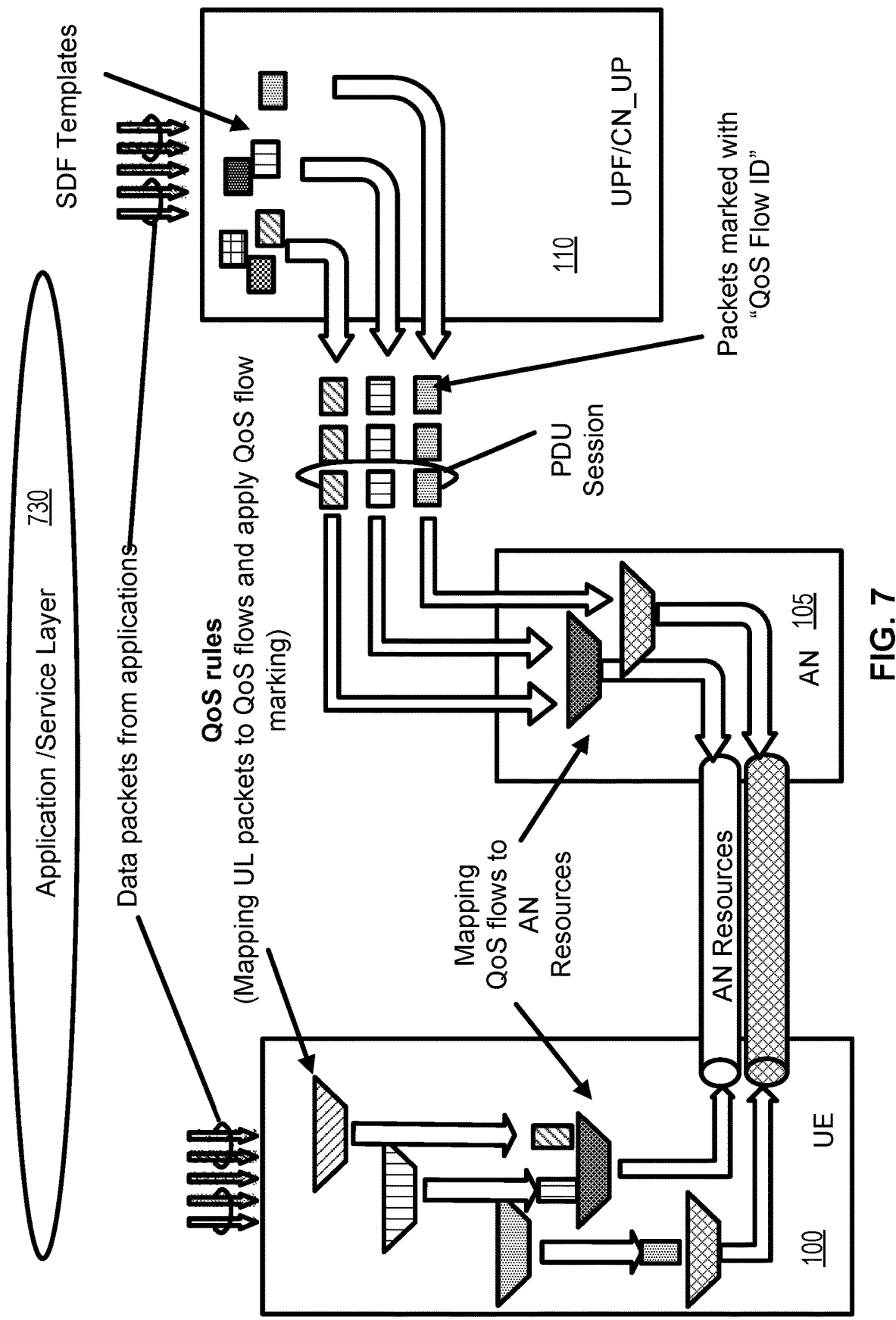
FIG. 7 is diagram of example traffic classification and marking as per an aspect of an embodiment of the disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the UPF 110 (CN_UP) 110, AN 105 and/or UE 100. Packets may arrive from and/or destined to the application/service layer 730 of UE 100, UPF 110 (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may also include point-to-point reference points where necessary. (2) FIG. 2 is an example reference point representation, showing the interaction between the NF services in the network functions described by point-to-point reference point (e.g. N11) between any two network functions.

Figure 10:
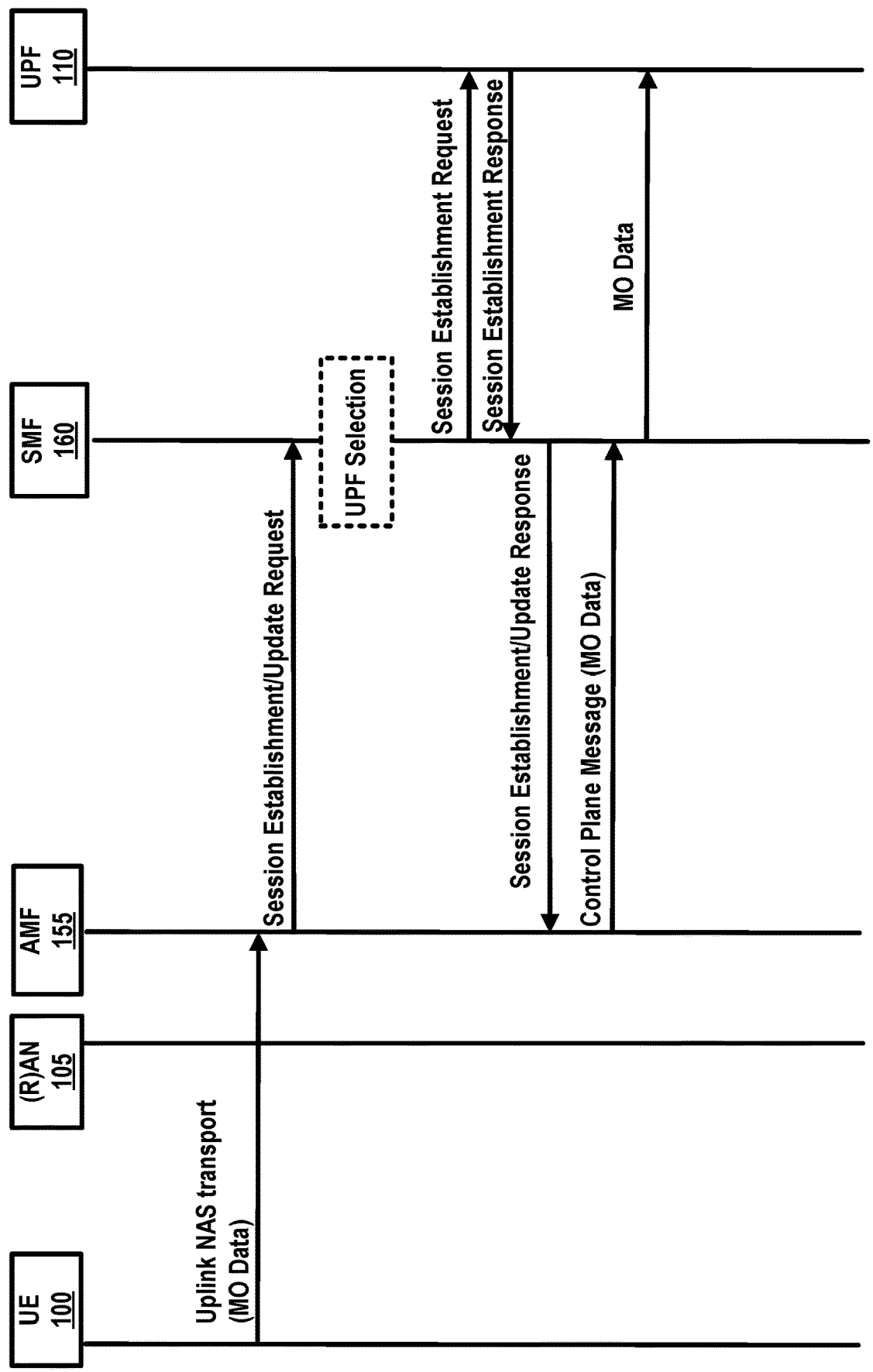
FIG. 10 is an example call flow diagram illustrating an aspect of an embodiment of the disclosure.
Figure 15:
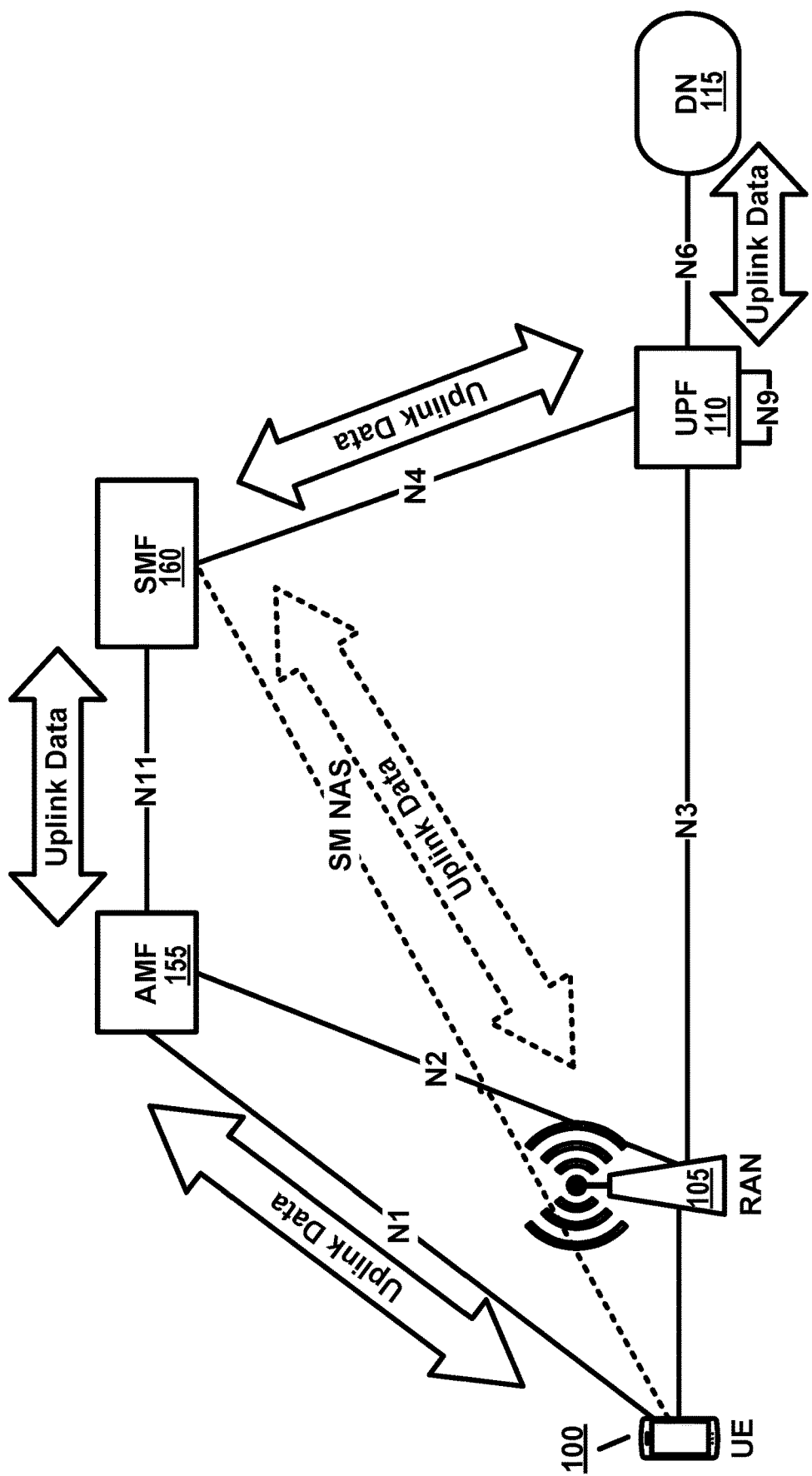
FIG. 15 is an example diagram illustrating an aspect of an embodiment of the disclosure.

As depicted in an example FIG. 10, and FIG. 15, the 5G system furthermore may support mobile originated and/or mobile terminated data transmission over control plane. In an example embodiment, a session may be created to transfer uplink data from a wireless device, the UE 100, to a UPF 110. The session may be via control plane network elements such as an AMF 155, a SMF 160, a NEF 125 and/or the like. An example FIG. 15 may depict an aspect of an embodiment wherein the UE 100 may transfer the uplink data to the UPF 110, via the AMF 155, and/or the SMF 160.

In an example embodiment, the wireless device, the UE 100, may establish a first NAS signaling connection with the AMF 155. The wireless device may transmit, to the AMF 155, uplink data that may be included in a first NAS message (e.g., a control plane service request message, and/or the like) transmitted over the first NAS signaling connection. The first NAS message (e.g., the control plane service request message), may comprise one or more of a protocol discriminator, security header type, control plane service request message identity, a NAS key set identifier, a NAS message container, a PDU session context status, a bearer context status, and device properties. The NAS message container may comprise the uplink data to be transmitted to the AMF 155. In an example, the uplink data may be encapsulated in the first NAS message. In an example, the uplink data may be sent via the NAS message container of the first NAS message.

In an example, the first NAS message may further comprise a CIoT support indicator (e.g., CIoT Optimizations Support Indication and/or the like) that may further be used to guide the AMF 155 to retain and/or buffer the uplink data received via the first NAS message. In an example, when the AMF 155 receives the CIoT support indicator, the AMF 155 may recognize that the uplink data is for a small data transmission via a control plane core and/or a user plane core (e.g. a control plane CIoT optimization and/or a user plane CIoT optimization case). The AMF 155 may retain and/or buffer the uplink data at least based on the CIoT support indicator.

In an example, transmission of the uplink data from the wireless device to the AMF 155, may be accomplished by using NAS transport capabilities of RRC signaling and/or using S1-AP and/or NGAP signaling. The RRC signaling may be transmitted from the wireless device to a base station (e.g. gNB, eNB, and/or the like). The S1-AP and/or NGAP signaling (e.g. UPLINK NAS TRANSPORT message, NAS NON DELIVERY INDICATION message, INITIAL UE MESSAGE, and/or the like) may be transmitted between the base station and the AMF 155. The AMF 155 may prioritize NAS signaling PDUs over NAS PDUs that may carry data, to reduce potential conflicts. The AMF 155 may check the integrity of the uplink data and decrypt the uplink data if the uplink data encrypted.

In an example embodiment, when the wireless device and the AMF 155 support CIoT optimization, the AMF 155 and the wireless device may transfer data in the first NAS message and/or a NAS PDU. The first NAS message and/or the NAS PDU may comprise at least one or more of a PDU session identifier, and/or a bearer identity (e.g., EPS bearer identity) of a PDU session associated with the uplink data. In an example embodiment, the AMF 155 may determine, based on a subscription information of the wireless device, that the CIoT optimization and/or (small) data transmission over control plane may be used.

In an example, the SMF 160 may receive from the AMF 155, a first message comprising at least one or more of the elements of the first NAS message (e.g., a parameter indicating data transfer over a control plane, indication of (small) data transmission over control plane, CIoT optimizations support indication, and/or the like). The first message may be configured to request to configure a session for a wireless device via the AMF and the SMF. In an example, the first message may be configured to request a session configuration associated with the session for the wireless device between the SMF 160 and the AMF 155. The first message may be transmitted over a control plane tunneling protocol (e.g., GTP) or a hypertext transfer protocol (HTTP). If the GTP is used, a first information element of the GTP (e.g., the parameter indicating data transfer over the control plane, CIoT optimizations support indication, and/or the like) may be employed to indicate the cause of the first message. In an example a second information element (e.g., control plane only PDN connection indication, and/or the like) may be employed to indicate the cause of the first message.

The first message may further comprise one or more of an identifier of a subscriber (e.g., SUPI), a DNN, a S-NSSAI, a first identifier of the session e.g., PDU Session ID an identifier of the AMF (e.g., AMF ID, and/or the like), N1 SM container; permanent equipment identifier, PEI; UE location information, AN type; H-SMF identifier/address; and/or the like. The first message may further comprise an AMF address, an AMF tunnel endpoint identifier (TEID), and/or the like. The AMF TEID (and/or the AMF address) may be employed to configure one or more parameters between the AMF 155 and the SMF 160 for the session of the wireless device. The AMF 155 may transmit, to the SMF 160, the uplink data via the session.

In response to receiving the first message, the SMF may select the UPF and determine an identifier of the UPF (e.g., UPF ID, UPF address, and/or the like). In an example, the SMF 160 may select the UPF at least based on one or more of the UPF dynamic load, the UPF 110 relative static capacity among UPFs 110 supporting the same DNN, UPF 110 location available at the SMF 160, UE 100 location information, capability of the UPF 110 and/or the functionality required for the particular UE 100 session (e.g., an appropriate UPF 110 may be selected by matching the functionality and features required for the UE), Data Network Name (DNN), PDU session type (i.e. IPv4, IPv6, Ethernet Type or Unstructured Type), SSC mode selected for the PDU session, the UE 100 subscription profile in UDM, routing destination of the uplink data (e.g. application location, Data Network Access Identifier, DNAI), local operator policies, S-NSSAI, and/or the like.

The SMF 160 may send, to the UPF, a second message. In an example, the second message may be sent over a tunneling protocol and/or N4 interface and/or session. The second message may comprise at least one or more of: information elements received via the first message (e.g., an identifier of the session, and/or the like), from the AMF, an identifier of the UPF, an address of the UPF, the AMF ID, the AMF address and/or the AMF 155 TEID (e.g., F-TEID), an identifier of the SMF (e.g., a first SMF ID), a first SMF address and/or a first SMF TEID (e.g., F-TEID), a UE 100 identifier (of the wireless device), packet detection, enforcement and/or reporting rules to be installed on the UPF, and/or the like. The second message may be configured to request a session configuration for the wireless device between the SMF 160 and the UPF 110. In an example, the first SMF TEID (and/or the first SMF address, the first SMF ID) may be employed to configure one or more parameters between the SMF and the UPF for the session of the wireless device. The SMF 160 may transmit, to the UPF 110, the uplink data via the session.

In an example embodiment, the first message may further comprise the parameter indicating data transfer over the control plane, an indication for CIoT, NB-IoT support, and/or the like. In an example, the second message may further comprise the parameter indicating data transfer over the control plane, an indication for CIoT, NB-IoT support, and/or the like. In an example, if GTP (e.g., GTP) is used, the first information element (e.g., CIoT Optimizations Support Indication) may be included to indicate the cause of the message. The indication for CIoT and/or NB-IoT support may be used to establish a connectivity for transmission of data over a control plane tunneling protocol or a user plane tunneling protocol and/or N4 interface (or N4 session) between AMF 155 and SMF 160 or between SMF 160 and UPF 110 (e.g., N4 session, N4 interface, and/or the like).

In an example, the first message and/or the second message may further comprise at least one or more of the following information elements (IE): ME identity (MEI), user location, serving network, radio access technology (RAT) type, indication flags, sender F-TEID and/or receiver F-TEID for control plane, aggregate maximum bitrate (AMBR), bearer and/or PDU contexts to be modified/established/removed, UE 100 time zone, AMF 155 and/or SMF 160 fully qualified PDU connection set identifier (e.g., the identifier of the session, N4 session ID, and/or the like), UE 100 local IP address, UE 100 UDP port, AMF 155 and/or SMF 160 local distinguished name and/or locator, RAN, eNB or gNB local IP address and/or UDP port, an identifier of the AMF (e.g., AMF ID, AMF address, AMF FQDN, and/or the like), AMF 155 TEID, first SMF 160 TEID, operator selection entity, presence reporting area information, AMF 155 and/or SMF 160 and/or UPF 110 overload control information, serving PLMN rate control information, MO exception data counter, IMSI, and/or the like.

In an example, in response to sending the second message to the UPF 110, the SMF 160 may receive, from the UPF 110, a third message. The third message may be sent over the N4 interface between the SMF 160 and the UPF 110. The third message may comprise at least one of a UPF 110 ID/locator, a UPF 110 address, and/or a UPF 110 tunnel endpoint identifier (e.g., TEID, F-TEID and/or the like). The third message may further comprise CN DL tunnel info, and/or UL tunnel info (i.e. CN N3 tunnel info) if the UPF 110 allocates CN tunnel information. In an example, the UPF 110 TEID (and/or the UPF 110 address, the UPF 110 ID) may be employed to configure one or more parameters between the SMF 160 and the UPF 110 for the session of the wireless device. The SMF 160 may transmit, to the UPF 110, the uplink data via the session.

The SMF 160 may send to the AMF 155, in response to the third message, a fourth message comprising one or more of the UPF 110 ID/locator, the UPF 110 address, the UPF 110 tunnel endpoint identifier (e.g., TEID, F-TEID and/or the like), a second SMF 160 address, a second SMF 160 tunnel endpoint identifier (e.g., TEID, F-TEID and/or the like), and/or a PDU session identifier. In an example, the second SMF TEID (and/or the second SMF address, the second SMF ID) may be employed to configure one or more parameters between the SMF 160 and the AMF 155 for the session of the wireless device. The AMF 155 may transmit, to the SMF 160, the uplink data via the session.

In an example, the AMF 155 may transmit, to the SMF 160, the uplink data received from the wireless device via the first NAS message. In an example, the transmission of the uplink data may be based on one or more elements of the first message and/or the fourth message. In an example, the AMF 155 may send the uplink data over a control plane tunneling protocol (e.g., GTP) and/or a hypertext transfer protocol. The control plane tunneling protocol (GTP) may employ at least one of the elements of the first message, the second message, the first information element of the first NAS message, the second information element of the first NAS message, the AMF 155 address (e.g., IP address), the AMF 155 TEID (e.g., F-TEID), the AMF 155 UDP port, the SMF 160 address (e.g., IP address) the second SMF 160 TEID (F-TEID), the SMF 160 UDP port, and/or the like for the session configuration, and/or transfer of the uplink data for the wireless device between the AMF 155 and the SMF 160.

In an example, the hypertext transfer protocol, HTTP, may be employed for transmission of uplink data from the AMF 155 to the SMF 160. In an example, the HTTP may employ at least one of the AMF 155 IP address, an AMF 155 transmission control protocol port, TCP port, the SMF 160 IP address, a SMF 160 TCP port, and/or the like to establish an HTTP session. In an example, the SMF 160 and/or the AMF 155 may establish the HTTP session with the AMF 155 and/or the SMF 160 by establishing a transport layer connection such as a TCP connection and/or the like. The HTTP session may further comprise request-response transactions and/or methods such as CONNECT, GET, PUT and/or the like. The request-response transaction may comprise request messages and/or response messages. The request messages may comprise a request line, request header fields, an empty line, a message body and/or the like. The response messages may comprise a status line, response header fields, an empty line, a message body and/or the like. In an example, the HTTP session may employ the request messages, the response messages and/or methods, such as GET, PUT, and/or the like, to transfer the uplink data from the AMF 155 to the SMF 160.

In an example, the SMF 160 may transmit to the UPF 110, the uplink data at least based on one or more elements of the third message. In an example, the uplink data may be sent over a control plane tunneling protocol (e.g., GTP). The control plane tunneling protocol may employ at least one of the UPF 110 address (e.g., IP address) the UPF 110 TEID (F-TEID), the UPF 110 UDP port, and/or the like. In an example, a user plane tunneling protocol (e.g., GTP) may be employed to transmit the uplink data from the SMF 160 to the UPF 110. In an example, the user plane tunneling protocol may employ at least one of the UPF 110 address (e.g., IP address) the UPF 110 TEID (F-TEID), the UPF 110 UDP port, and/or the like to transfer the uplink data from the SMF 160 to the UPF 110.

In an example embodiment, the first message may be triggered when the wireless device and/or the AMF 155 support CIoT optimization. In an example, the AMF 155 and/or the wireless device, the UE 100, may transfer the uplink data in the first NAS message and/or the NAS PDU. The first NAS message and/or the NAS PDU may comprise at least one or more of the PDU session identifier, QoS flow identifier, and/or bearer identity (e.g. EPS bearer identifier, and/or the like) of the PDU session associated with the uplink data. In an example embodiment, the AMF 155 may determine, based on the subscription information, that the CIoT optimization and/or (small) data transmission over control plane may be used. In an example, the first NAS message may further comprise the CIoT support indicator that may further be used to guide the AMF 155 to initiate the first message and/or to retain and/or buffer the uplink data received via the first NAS message.

Figure 11:
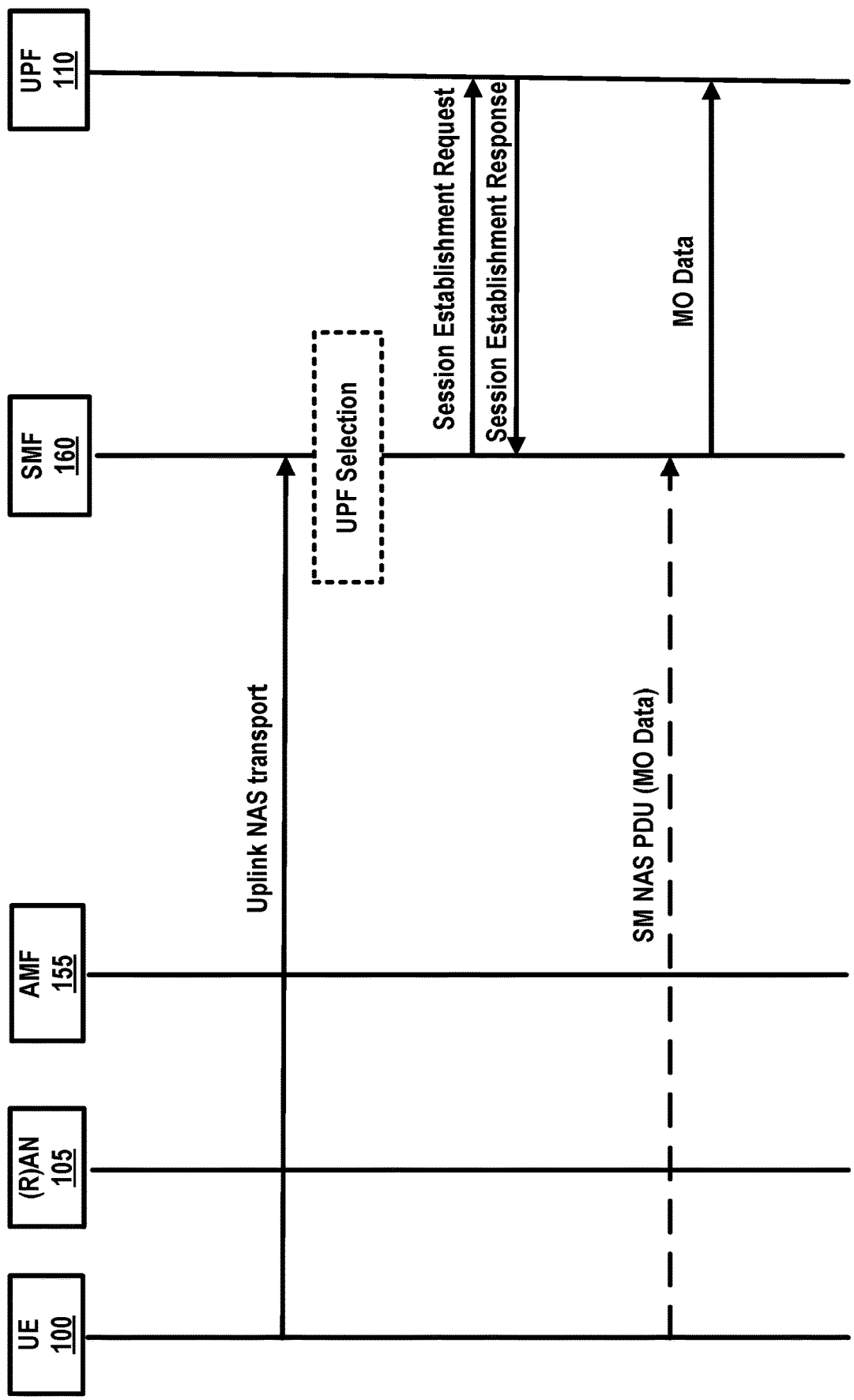
FIG. 11 is an example call flow diagram illustrating an aspect of an embodiment of the disclosure.

In an example FIG. 11, the uplink data (e.g., MO data) may be retained by the SMF 160.

In an example embodiment, the wireless device, the UE 100, may establish a second NAS signaling connection with the SMF 160 (e.g., a SM-NAS signaling). The wireless device may transmit, to the SMF 160, the uplink data that may be included in a SM NAS message (e.g., a control plane service request message, and/or the like), transmitted over the second NAS signaling connection. The SM NAS message (e.g., the control plane service request message), may comprise one or more of the UE 100 identifier, the protocol discriminator, security header type, control plane service request message identity, the NAS key set identifier, the NAS message container, a PDU session context status, a bearer context status, and device properties and/or the like. The NAS message container may comprise the uplink data to be transmitted to the SMF 160. In an example, the uplink data may be encapsulated in the SM NAS message. In an example, the uplink data may be sent via the NAS message container of the SM NAS message.

In an example, the SM NAS message may further comprise one or more of SUPI, DNN, S-NSSAI, PDU Session ID, an identifier of the AMF (e.g., AMF ID), N1 SM container, permanent equipment identifier, PEI, location information, AN type, H-SMF identifier/address, the AMF 155 address, the AMF 155 tunnel endpoint identifier (TEID), and/or the like. The UE identifier, the SMF address, the second SMF TEID, and/or the like may be employed to transmit/receive SM NAS messages to/from the SMF 160.

In an example embodiment, when the wireless device, the UE 100, the SMF 160 and/or the AMF 155 support CIoT optimization, the AMF 155 and/or the UE 100 may transfer data in the SM NAS message and/or the SM NAS PDU. The SM NAS message and/or the SM NAS PDU may comprise at least one or more of a PDU session identifier, and/or a bearer identity of a PDU session associated with the uplink data. In an example embodiment, the SMF 160 and/or, the AMF 155 may determine, based on the subscription information, that the CIoT optimization and/or (small) data transmission over control plane may be used.

In an example, transmission of the uplink data from the wireless device to the SMF 160, may be accomplished by using NAS transport capabilities of RRC signaling and/or using S1-AP and/or NGAP signaling. The RRC signaling may be transmitted from the wireless device to a base station (e.g. gNB, eNB, and/or the like). The S1-AP and/or NGAP signaling (e.g. UPLINK NAS TRANSPORT message, NAS NON DELIVERY INDICATION message, INITIAL UE MESSAGE, and/or the like) may be transmitted between the base station and the AMF 155. The AMF 155 may forward the SM NAS message to the SMF 160 if the SM NAS signaling is used. The AMF 155 may prioritize NAS signaling PDUs over NAS PDUs and/or SM NAS that may carry data, to reduce potential conflicts. The AMF 155 and/or the SMF 160 may check the integrity of the uplink data and decrypt the uplink data if the uplink data encrypted.

In an example, the SMF 160 may select the UPF 110. In an example, the SMF 160 may select the UPF 110 at least based on one or more of the UPF 110 dynamic load, the UPF 110 relative static capacity among UPFs 110 supporting the same DNN, UPF 110 location available at the SMF 160, UE 100 location information, capability of the UPF 110 and/or the functionality required for the particular UE 100 session (e.g., an appropriate UPF 110 may be selected by matching the functionality and features required for the UE), Data Network Name (DNN), PDU session type (i.e. IPv4, IPv6, Ethernet Type or Unstructured Type), SSC mode selected for the PDU session, the UE 100 subscription profile in a UDM 140, routing destination of the uplink data (e.g. application location, Data Network Access Identifier, DNAI), local operator policies, S-NSSAI, and/or the like.

The SMF 160 may send, to the UPF 110, the second message. In an example, the second message may be sent over the tunneling protocol and/or N4 interface. The second message may further comprise at least one or more of: information elements received from the wireless device via the SM NAS message. The second message may be configured to request the session configuration for the wireless device between the SMF 160 and the UPF 110. In an example, the first SMF 160 TEID (and/or the first SMF 160 address, the first SMF ID) may be employed to configure one or more parameters between the SMF 160 and the UPF 110 for the session of the wireless device. The SMF 160 may transmit, to the UPF 110, the uplink data via the session.

In an example, in response to sending the second message to the UPF 110, the SMF 160 may receive, from the UPF 110, the third message. The third message may be sent over the N4 interface between the SMF 160 and the UPF 110. The third message may comprise at least one of a UPF 110 ID/locator, a UPF 110 address, a UPF tunnel endpoint identifier (e.g., TEID, F-TEID and/or the like), and/or the like. The third message may further comprise CN DL tunnel info, and/or UL tunnel info (i.e. CN N3 tunnel info) if the UPF 110 allocates CN tunnel information. In an example, the UPF 110 TEID (and/or the UPF 110 address, the UPF 110 ID) may be employed to configure one or more parameters between the SMF 160 and the UPF 110 for the session of the wireless device. The SMF 160 may transmit, to the UPF 110, the uplink data via the session.

In an example, the SMF 160 may transmit to the UPF 110, the uplink data at least based on one or more elements of the third message. In an example, the uplink data may be sent over the control plane tunneling protocol (e.g., GTP). The control plane tunneling protocol may employ at least one of the UPF 110 address (e.g., IP address) the UPF 110 TEID (F-TEID), the UPF 110 UDP port, and/or the like to transmit the uplink data from the SMF 160 to the UPF 110. In an example, the user plane tunneling protocol (e.g., GTP-U) may be employed to transmit the uplink data from the SMF 160 to the UPF 110. The user plane tunneling protocol may employ at least one of the UPF 110 address (e.g., IP address) the UPF 110 TEID (F-TEID), the UPF 110 UDP port, and/or the like to transmit the uplink data from the SMF 160 to the UPF 110.

Figure 12:
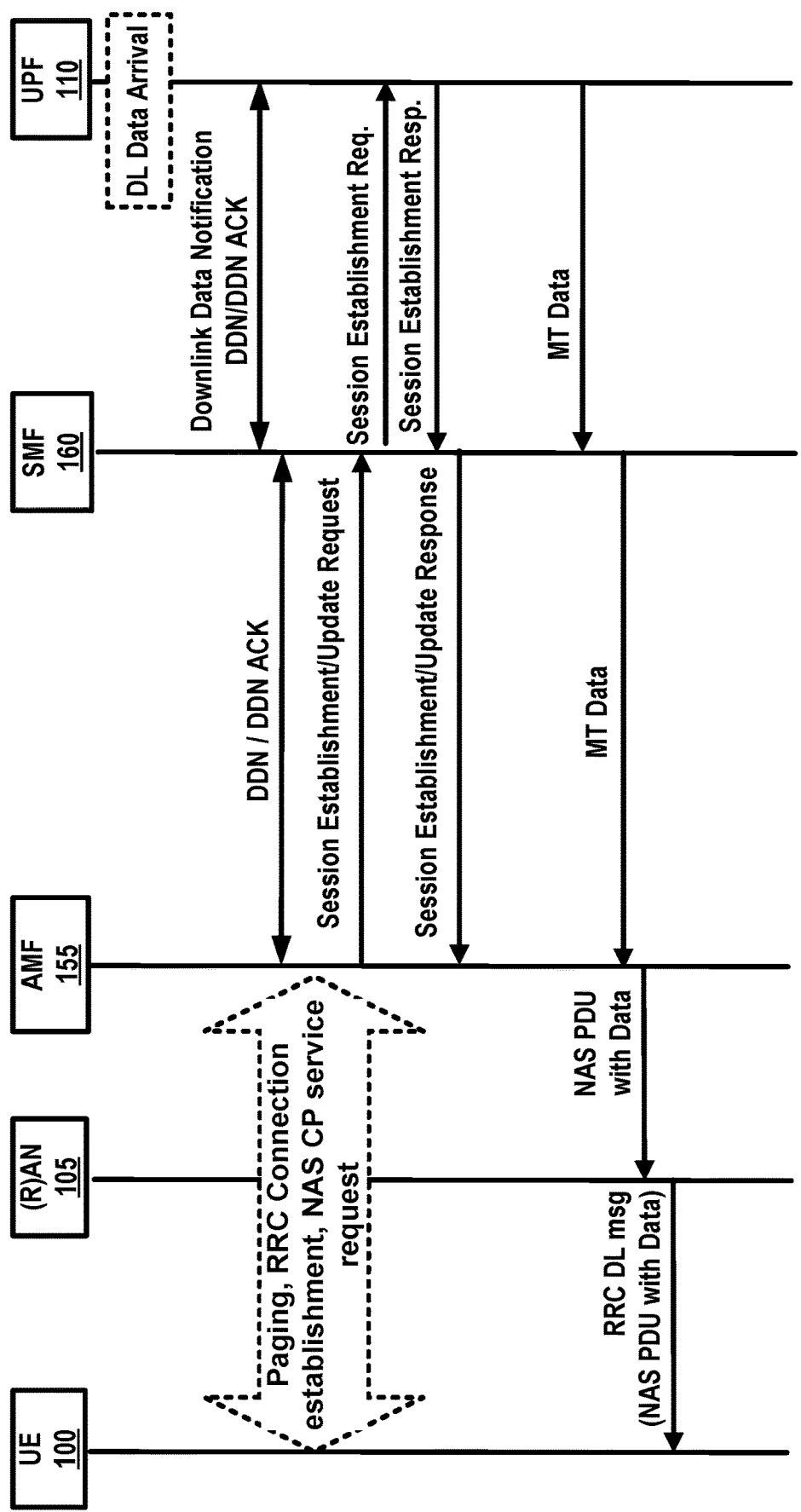
FIG. 12 is an example call flow diagram illustrating an aspect of an embodiment of the disclosure.

An example FIG. 12 may depict a mobile terminating downlink data transmission. In an example, the UPF 110 may receive downlink data to be transmitted to the wireless device, the UE.

In an example, the SMF 160 may receive from the UPF 110 a fifth message, a downlink data notification, DDN. In an example, the fifth message may be configured to request an indication for the UE 100 reachability. The fifth message may comprise at least one or more of a request indication for the UE 100 reachability, an identifier of a network element requesting the UE 100 reachability, and/or the UE 100 identifier of the wireless device. In an example, the fifth message may further comprise at least one or more of a cause, a PDU session identifier, a bearer identifier, allocation/retention policy, IMSI, sender F-TEID, indication flags, load control information, overload control information, paging and service information, and/or the like.

In an example, the SMF 160 may send to the AMF 155, a sixth message comprising the DDN, in response to receiving the fifth message. The sixth message may be configured to notify (the AMF 155) the downlink data. The sixth message may comprise one or more elements of the fifth message. In an example, the sixth message may trigger a paging procedure wherein the wireless device may receive a paging message. In an example, the paging message may trigger a service request from the wireless device, the UE 100. In an example, the paging message may be associated with the sixth message.

In an example, if the UE 100 is registered in the AMF 155 and considered reachable for paging, the AMF 155 may send the paging message (e.g., a NAS ID for paging, TAI(s), the UE 100 identity based DRX index, Paging DRX length, list of CSG IDs for paging, Paging Priority indication and/or the like) to each base station (e.g., eNB, gNB, and/or the like) belonging to the tracking area(s) in which the UE 100 is registered. In an example, if the base station(s) receive paging messages from the AMF 155, the UE 100 may be paged by the base station(s). In an example, the paging message may trigger the service request from the wireless device, the UE. In an example embodiment, the service request may comprise at least establishing the first NAS signaling connection with the AMF 155. The first NAS message (e.g., the control plane service request message), may comprise one or more of a protocol discriminator, security header type, control plane service request message identity, a NAS key set identifier, a NAS message container, a PDU session context status, a bearer context status, and device properties.

In an example, the AMF 155 may send to the SMF 160 the first message in response to the service request message received from the wireless device. The first message may be configured to request the session configuration for the wireless device between the AMF 155 and the SMF 160.

In response to receiving the first message, the SMF 160 may send, to the UPF 110, the second message. The second message may be configured to request the session configuration for the wireless device between the SMF 160 and the UPF 110.

In an example, in response to sending the second message to the UPF 110, the SMF 160 may receive, from the UPF 110, the third message. The third message may be configured to request the session configuration for the wireless device between the SMF 160 and the UPF 110.

The SMF 160 may send to the AMF 155, in response to the third message, the fourth message. The fourth message may be configured to request the session configuration for the wireless device between the AMF 155 and the SMF 160.

In an example, the SMF 160 may send to the UPF 110 a seventh message configured to acknowledge the fifth message.

In an example, the AMF 155 may send to the SMF 160 an eighth message configured to acknowledge the sixth message.

In an example, the SMF 160 may receive from the UPF 110, downlink data at least based on one or more elements of the second message and/or the third message. In an example, the downlink data may be sent over the control plane tunneling protocol (e.g., GTP). The control plane tunneling protocol may employ at least one of the UPF 110 address (e.g., IP address) the UPF 110 TEID (F-TEID), the UPF 110 UDP port, the first SMF 160 address, the first SMF 160 TEID (e.g., F-TEID) and/or the like. In an example, a user plane tunneling protocol (e.g., GTP-U) may be employed to transmit the downlink data from the UPF 110 to the SMF 160. The user plane tunneling protocol may employ at least one of the UPF 110 address (e.g., IP address) the UPF 110 TEID (F-TEID), the UPF 110 UDP port, the first SMF 160 address, the first SMF 160 TEID (e.g., F-TEID), and/or the like.

In an example, the SMF 160 may transmit to the AMF 155, the downlink data at least based on one or more elements of the first message and/or the fourth message.

In an example, the downlink data from the SMF 160 to the AMF 155, may be sent over a control plane tunneling protocol (e.g., GTP) and/or a hypertext transfer protocol. The control plane tunneling protocol (GTP) may employ at least one of the AMF 155 address (e.g., IP address) AMF 155 TEID (e.g., F-TEID), the AMF 155 UDP port, the second SMF 160 address (e.g., IP address) the second SMF 160 TEID (F-TEID), the SMF 160 UDP port, and/or the like.

In an example, the hypertext transfer protocol, HTTP, may be employed for transmission of downlink data from the SMF 160 to the AMF 155. In an example, the HTTP may employ at least one of the AMF 155 IP address, the AMF 155 transmission control protocol port, TCP port, the SMF 160 IP address, the SMF 160 TCP port and/or the like. In an example, the HTTP may employ methods (e.g., GET, PUT, and/or the like) to transfer the downlink data from the SMF 160 to the AMF 155.

In an example, the AMF 155 may transmit the downlink data to the wireless device, the UE 100, over the downlink NAS message (e.g., "DOWNLINK NAS TRANSPORT message"). The downlink NAS message, may comprise one or more of a protocol discriminator, security header type, control plane service request message identity, a downlink NAS transport message identity, a NAS key set identifier, a NAS message container, a PDU session context status, a bearer context status, device properties and/or the like. The downlink NAS message container may comprise the downlink data to be transmitted to the UE. In an example, the downlink data may be encapsulated in the downlink NAS message. In an example, the downlink data may be sent via the NAS message container of the downlink NAS message.

The AMF 155 may encrypt and integrity protect the downlink data and/or may send it to the base station (e.g., eNB, gNB and/or the like) using a downlink NAS PDU carried by a downlink S1-AP and/or NGAP message. If the base station may support acknowledgements of downlink NAS PDUs and if acknowledgements of downlink NAS PDUs are enabled in the subscription information for the wireless device, the AMF 155 may indicate in the downlink S1-AP message and/or the downlink NGAP message that acknowledgment may be requested from the base station.

Figure 13:
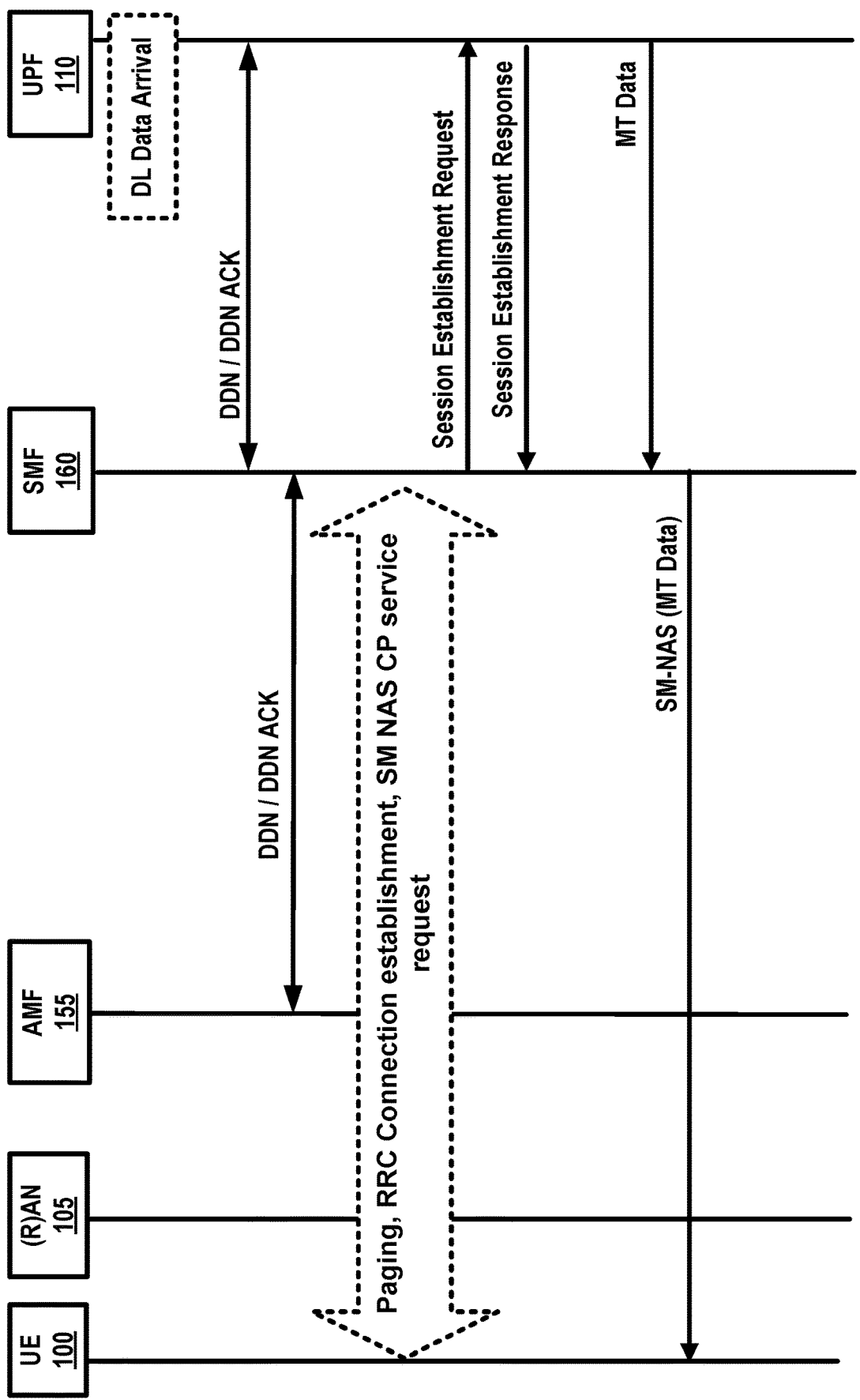
FIG. 13 is an example call flow diagram illustrating an aspect of an embodiment of the disclosure.

In an example FIG. 13, the downlink data may be transmitted over SM NAS messages.

In an example FIG. 13, the SMF 160 may receive from the UPF 110 the fifth message, the downlink data notification, DDN. In an example, the fifth message may be configured to request the indication for the UE 100 reachability. The fifth message may comprise at least one or more of a request indication for UE 100 reachability, an identifier of a network element requesting the UE 100 reachability, and/or the UE 100 identifier of the wireless device. In an example, the fifth message may further comprise at least one or more of a cause, PDU session identifier, a bearer identifier, allocation/ retention policy, IMSI, sender F-TEID, indication flags, load control information, overload control information, paging and service information, and/or the like.

In an example FIG. 13, the SMF 160 may send to the AMF 155, the sixth message in response to receiving the fifth message. The sixth message may be configured to notify (the AMF 155) the downlink data. The sixth message may comprise one or more elements of the fifth message. In an example, the sixth message may trigger the paging procedure wherein the wireless device, the UE, may receive the paging message. The paging message may trigger the service request from the wireless device, the UE. The paging message may be in response to the sixth message.

In an example FIG. 13, if the UE 100 is registered in the AMF 155 and considered reachable for paging, the AMF 155 may send the paging message (e.g., the NAS ID for paging, TAI(s), the UE 100 identity based DRX index, Paging DRX length, list of CSG IDs for paging, Paging Priority indication and/or the like) to each base station (e.g., eNB, gNB, and/or the like) belonging to the tracking area(s) in which the UE 100 is registered. In an example, if the base station(s) receive paging messages from the AMF 155, the UE 100 may be paged by the base station(s).

In an example FIG. 13, the service request from the wireless device may establish the second NAS signaling connection with the SMF 160 (e.g., the SM-NAS signaling). The wireless device may receive, from the SMF 160, downlink data that may be included in the SM NAS message (e.g., a control plane service request message, and/or the like) transmitted over the second NAS signaling connection. The SM NAS message (e.g., the control plane service request message), may comprise one or more of the UE 100 identifier, the protocol discriminator, security header type, control plane service request message identity, the NAS key set identifier, the NAS message container, the PDU session context status, the bearer context status, and device properties. The NAS message container may comprise the downlink data to be transmitted to the wireless device, the UE 100 from the SMF 160. In an example, the downlink data may be encapsulated in the SM NAS message. In an example, the downlink data may be sent via the NAS message container of the SM NAS message.

In an example FIG. 13, the SM NAS message may further comprise one or more of SUPI, DNN, S-NSSAI, PDU Session ID, AMF 155 ID, N1 SM container, permanent equipment identifier, PEI, UE 100 location information, AN type, H-SMF identifier/address, the AMF 155 address, the AMF 155 tunnel endpoint identifier (TEID), and/or the like. The UE 100 identifier, the second SMF 160 address, the second SMF 160 TEID, and/or the like may be employed to transmit/receive SM NAS messages to/from the SMF 160.

In response to receiving the service request message from the wireless device, the UE, the SMF 160 may send, to the UPF 110, the second message. The second message may be configured to request the session configuration (e.g. one or more parameters for the session) for the wireless device between the SMF 160 and the UPF 110.

In an example, in response to sending the second message to the UPF 110, the SMF 160 may receive, from the UPF 110, the third message. The third message may be configured to request the session configuration (e.g. one or more parameters for the session) for the wireless device between the SMF 160 and the UPF 110.

In an example FIG. 13, the SMF 160 may receive from the UPF 110, the downlink data at least based on one or more elements of the second message and/or the third message. In an example, the downlink data may be sent over the control plane tunneling protocol (e.g., GTP). The control plane tunneling protocol may employ at least one of the UPF 110 address (e.g., IP address) the UPF 110 TEID (F-TEID), the UPF 110 UDP port, the first SMF 160 address, the first SMF 160 TEID (e.g., F-TEID) and/or the like. In an example, the user plane tunneling protocol (e.g., GTP-U) may be employed to transmit the downlink data from the UPF 110 to the SMF 160. The user plane tunneling protocol may employ at least one of the UPF 110 address (e.g., IP address) the UPF 110 TEID (F-TEID), the UPF 110 UDP port, the first SMF 160 address, the first SMF 160 TEID (e.g., F-TEID), and/or the like.

In an example FIG. 13, the SMF 160 may transmit the downlink data to the wireless device, the UE, over the downlink NAS message. The SMF 160 may encrypt and integrity protect the downlink data and may send it to the base station (e.g., eNB, gNB and/or the like) using the downlink NAS PDU carried by the downlink S1-AP and/or NGAP message. If the base station may support acknowledgements of downlink NAS PDUs and if acknowledgements of downlink NAS PDUs are enabled in the subscription information for the wireless device, the SMF 160 may indicate in the downlink S1-AP message and/or the downlink NGAP message that acknowledgment may be requested from the base station.

In an example embodiment, the first SMF 160 TEID may be the same as the second SMF 160 TEID. In an example, the first SMF 160 TEID and the second SMF 160 TEID may be a fully qualified TEID, F-TEID.

In an example embodiment, the first SMF 160 address may be the same as the second SMF 160 address. In an example, the address (e.g., the AMF 155 address, the SMF 160 address and/or the like) may be a locator, a fully qualified name and/or the like.

Figure 14:
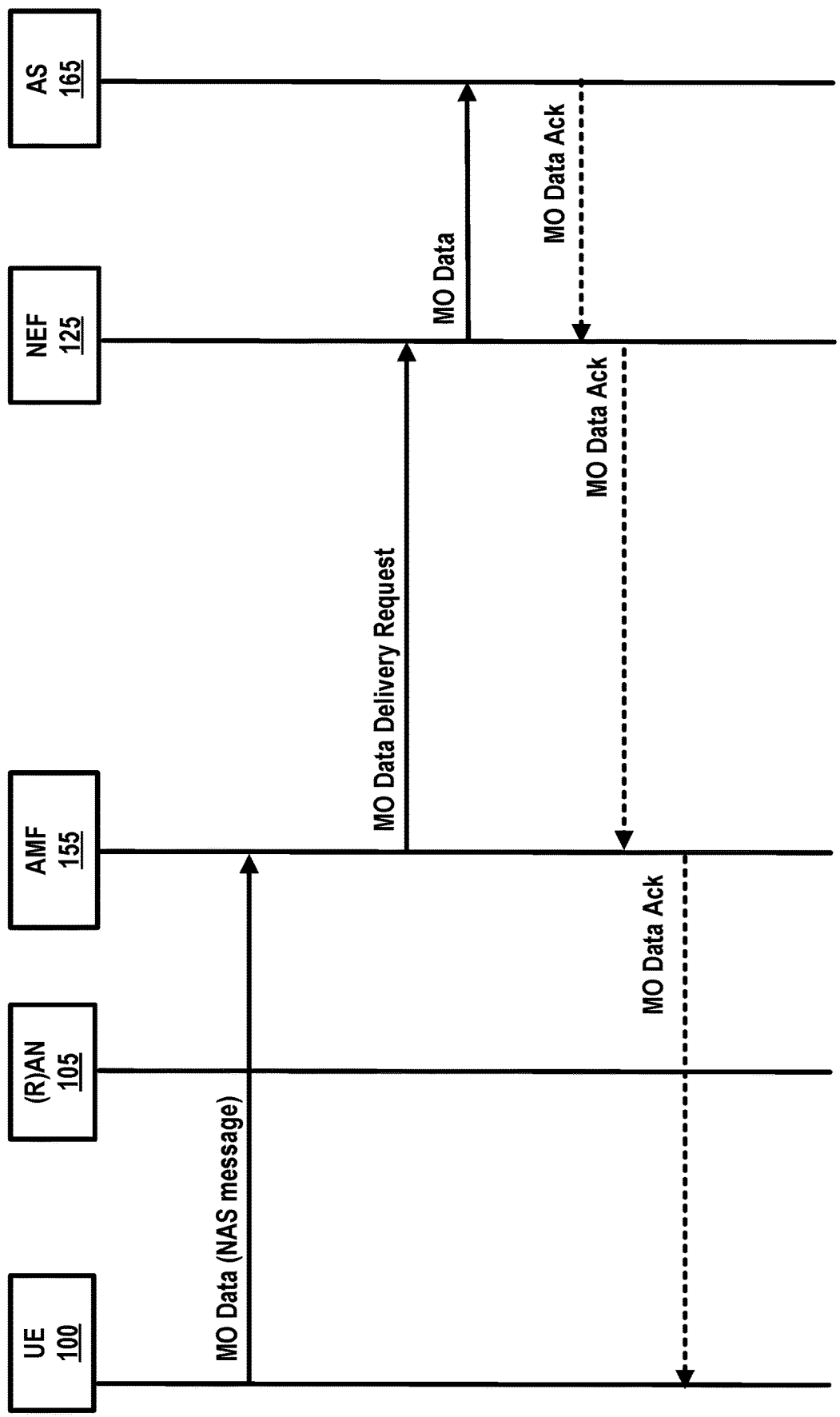
FIG. 14 is an example call flow diagram illustrating an aspect of an embodiment of the disclosure.
Figure 16:
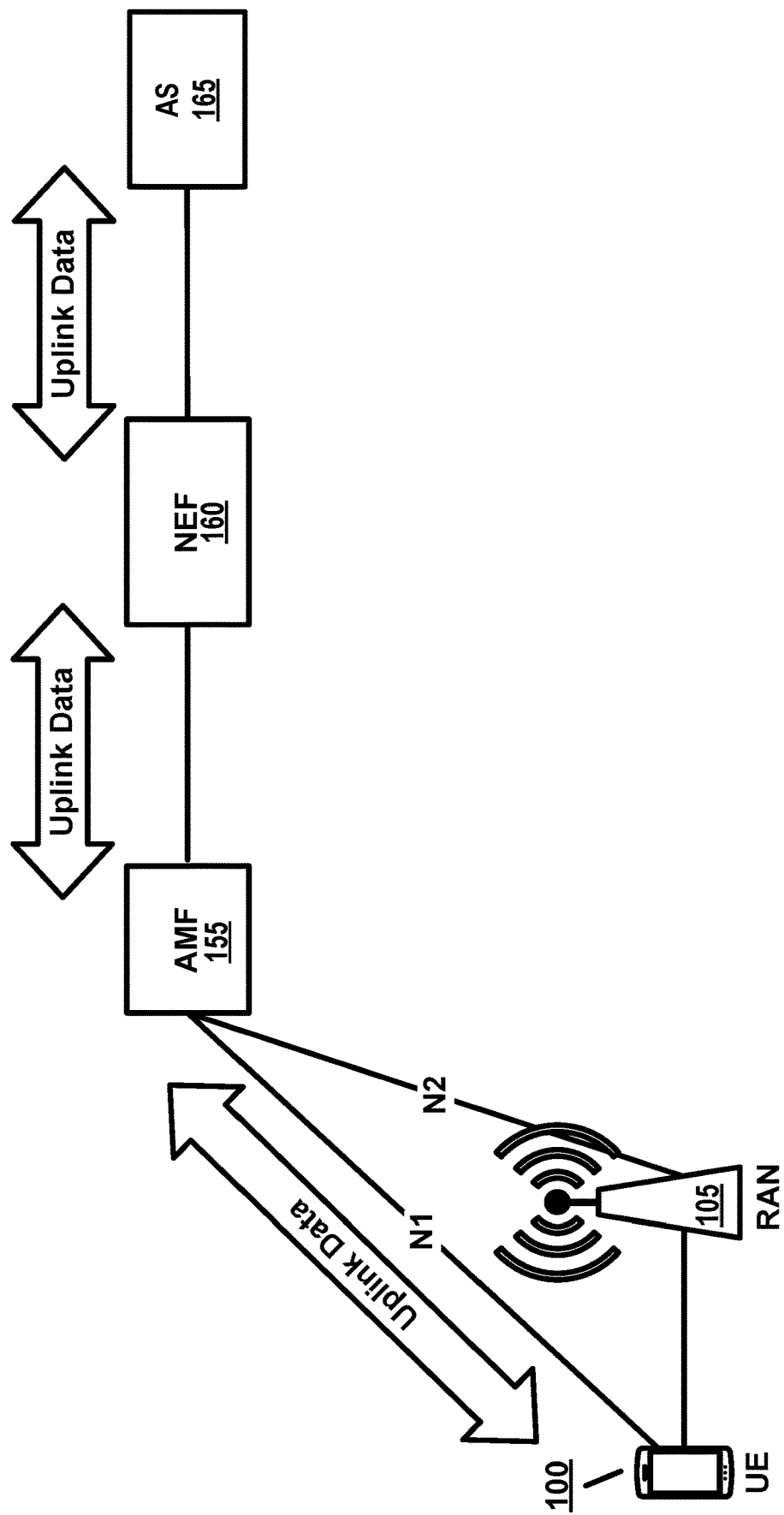
FIG. 16 is an example diagram illustrating an aspect of an embodiment of the disclosure.

An example FIG. 14 and FIG. 16 may depict an aspect of an embodiment wherein a PDU session may employ the AMF 155 and/or the NEF 160 to transfer the uplink data from the UE 100 to an AS 165.

In an example FIG. 14, the wireless device, the UE 100, may establish the PDU session towards the NEF. The wireless device may send data encapsulated in the first NAS message to the AMF 155 to be sent to the AS via the NEF.

In an example, the wireless device may perform an initial attach procedure where the AMF 155 may receive information (e.g., subscription information) that may indicate support for mobile originated data transmission over control plane. The AMF 155 upon receiving the indication for data over control plane transmission may allocate a session identity, a PDU session identity, or a bearer identity, may perform selection of a network exposure function (e.g., the NEF), and initiate a PDU session connectivity request towards the NEF with the acquired NEF identifier. The AMF 155 may create and/or establish the PDU session towards the NEF, by sending to the NEF one or more of a user identity (e.g., the UE 100 identifier and/or the like), a session identity, the bearer identity, the NEF identity, (serving) PLMN rate control, protocol configuration option, PCO, and/or the user (equipment) identifier and allocate the PDU session identifier. The NEF may create a context for the PDU session comprising one or more of the UE 100 identifier, APN/DNN, session identity, bearer identity, NEF identity, serving PLMN rate control, protocol configuration option, PCO, PDU session identity, and may respond to the AMF 155 with a confirmation of the PDU session establishment.

In an example embodiment, the wireless device may establish the first NAS signaling connection with the AMF 155. The wireless device may transmit uplink data that may be included in the first NAS message (e.g., the control plane service request message) transmitted over the first NAS signaling connection. The NAS message (e.g., the control plane service request message), may comprise one or more of the protocol discriminator, security header type, control plane service request message identity, the NAS key set identifier, a NAS message container, a PDU session context status, a bearer context status, and device properties. The NAS message container may comprise the uplink data to be transmitted to the AMF 155.

In an example embodiment, the NAS message may further comprise a data delivery submit request with a session ID, bearer ID, non-IP data, unstructured data or (small) data, (a reliable data service header may be included if the reliable data service is enabled), and/or the like.

The AMF 155 may receive from the wireless device, the UE 100, the first NAS message, further comprising the CIoT support indicator that may further be used to guide the AMF 155 to retain and/or buffer the data received via the first NAS message.

In an example, transmission of the uplink data from the wireless device to the AMF 155, may be accomplished by using NAS transport capabilities of RRC signaling and/or using S1-AP and/or NGAP signaling. The RRC signaling may be transmitted from the wireless device to a base station (e.g. gNB, eNB, and/or the like). The S1-AP and/or NGAP signaling (e.g. UPLINK NAS TRANSPORT message, NAS NON DELIVERY INDICATION message, INITIAL UE MESSAGE, and/or the like) may be transmitted between the base station and the AMF 155. The AMF 155 may prioritize NAS signaling PDUs over NAS PDUs that may carry data, to reduce potential conflicts. The AMF 155 may check the integrity of the uplink data and decrypt the uplink data if the uplink data encrypted.

In an example embodiment, when the wireless device and the AMF 155 support CIoT optimization, the AMF 155 and the wireless device may transfer the uplink data in the first NAS message and/or the NAS PDU. The first NAS message and/or the NAS PDU may comprise at least one or more of the PDU session identifier, and/or the bearer identity of the PDU session associated with the uplink data. In an example embodiment, the AMF 155 may determine, based on a subscription information, that the CIoT optimization and/or (small) data transmission over control plane may be used.

In an example, the AMF 155 may send a ninth message, a data delivery request message to the NEF. The ninth message, the data delivery request message, may comprise the uplink data (e.g., MO data) received from the UE 100 via the first NAS message, a user identity, a session identifier, a bearer identifier, a target network function ID (e.g., the NEF ID), MO Exception data counter, and/or the like. In an example embodiment, the AMF 155 may include the MO Exception data counter if the RRC establishment cause is set to "MO exception data" and the UE 100 is accessing via a NB-IoT RAT.

In an example, prior to establishing the PDU connectivity to the AS via the NEF, a configuration procedure may be performed by the AS. The configuration procedure may comprise a configuration request message that may be sent from the AS to the NEF. The configuration request message may comprise at least one or more of an identifier (e.g., MSISDN, AS identifier, and/or the like), connection duration, a requested action identifier, reliable data service configuration and/or the like. The requested action identifier may be used to guide the NEF to perform an action on a transaction. In an example, the action may be cancel, update and/or the like.

The NEF may send to the UDM an authorization request message to authorize the configuration request. The UDM may examine the authorization request and may send a first authorization response (e.g., acceptance or failure with cause) to the NEF. The NEF may send a second authorization response to the AS to acknowledge the acceptance of the configuration request.

In an example, the NEF, upon receiving the data delivery request message may determine the destination AS based on the information received from the data delivery request message and/or the configuration request. The NEF may send to the AS, a tenth message, a second data delivery request message comprising the elements of the ninth message, the uplink data received from the ninth message. The tenth message may further comprise an indication of the uplink data arrival.

In an example, the AS may send a first acknowledgment message to the NEF, comprising a response with an acknowledgement for the receipt of the data. The first acknowledgment message may further comprise a cause.

In an example, the NEF may send a second acknowledgment message to the AMF 155, in response to the request of the first acknowledgment message. The second acknowledgment message may comprise error codes (if the procedure is not successful). If reliable data delivery option was selected, the AMF 155 may acknowledge the transmission of the uplink data to the wireless device.

In an example, the AMF 155 may employ services (e.g., application triggering service, event exposure operations and/or the like) offered by the NEF to access the AS. In an example, the AS may employ services offered by the NEF for authorization and configuration (e.g., the configuration request, and/or the like).

An example FIG. 10 may depict an example call flow diagram as per an aspect of an embodiment of the present invention.

In an example, an SMF 160 may receive, from an AMF 155, a first message configured to request a session configuration (e.g. one or more parameters for the session) for a wireless device between the SMF 160 and the AMF 155. The first message may comprise at least one of: an AMF 155 address; and an AMF 155 tunnel endpoint identifier (TEID). In an example, the SMF 160 may send a UPF 110, in response to the first message, a second message configured to request a session configuration between the SMF 160 and the UPF 110, the second message may comprise at least one of: the AMF 155 address; the AMF 155 TEID; a first SMF 160 address; and a first SMF 160 TEID. In an example, the SMF 160 may receive from the UPF 110, a third message in response to the second message, the third message may comprise at least one of: a UPF 110 address; and/or a UPF 110 TEID. In an example, the SMF 160 may send, to the AMF 155, a fourth message in response to the third message. The fourth message may comprise at least one of: the UPF 110 address; the UPF 110 TEID; a second SMF 160 address; and/or a second SMF 160 TEID.

In an example embodiment, the SMF 160 may receive from the AMF 155, uplink data at least based on one or more elements of the first message and the fourth message. In an example, the SMF 160 may send to the UPF 110 the uplink data at least based on one or more elements of the third message. In an example, the AMF 155 may transmit the first message in response to receiving the uplink data from the wireless device. In an example embodiment, the SMF 160 may receive from the UPF 110, downlink data at least based on one or more elements of the second message and the third message. In an example, the SMF 160 may send to the AMF 155, the downlink data at least based on one or more elements of the first message.

In an example, the SMF 160 may receive from the UPF 110, a fifth message configured to notify downlink data for the wireless device. The fifth message may comprise at least one of: a request indication for UE 100 reachability; an identifier of a network element requesting the UE 100 reachability; and/or a UE 100 identifier of the wireless device. In an example, the SMF 160 may send to the AMF 155 in response to the fifth message, a sixth message configured to notify the downlink data. The sixth message may comprise one or more elements of the fifth message. In an example, the SMF 160 may receive from the AMF 155, the first message in response to a service request from the wireless device. The service request may be transmitted at least based on a paging message in response to the sixth message. In an example, the SMF 160 may send to the UPF 110, a seventh message configured to acknowledge the fifth message.

In an example, the AMF 155 may receive from a wireless device, uplink data via a control plane message. In an example, the SMF 160 may receive from the AMF 155, the first message over at least one of: a control plane tunneling protocol, or a hypertext transfer protocol (HTTP), and/or the like. In an example, the SMF 160 may select the UPF 110. In an example the first SMF 160 address may be the second SMF 160 address. In an example, the first SMF 160 TEID is the second SMF 160 TEID. In an example, the first message may further comprise a UE 100 identifier of the wireless device.

In an example, a session management function (SMF) may receive from an access and mobility management function (AMF), a first message indicating a request to configure a first session for a wireless device via the SMF and the AMF. The first message may comprise a first identifier of the first session, a parameter indicating data transfer over control plane, and/or the like. In an example, in response to receiving the first message, the SMF may select a user plane function (UPF). The SMF may send to the UPF, a second message indicating a request to configure a second session between the SMF and the UPF. The second message may comprise a second identifier of the second session, the parameter indicating data transfer over control plane, and/or the like. The SMF may receive from the AMF, uplink data via the first session. The SMF may send to the UPF, the uplink data via the second session.

In an example, the first message may comprise at least one of an identifier of the SMF, an address of the SMF, and/or the like. In an example, the first message may comprise at least one of an identifier of the AMF, an address of the AMF, and/or the like. In an example, the second message may comprise at least one of an identifier of the SMF, an address of the SMF, and/o the like. In an example, the second message may comprise at least one of an identifier of the UPF, an address of the UPF, and/or the like. In an example, the SMF may select the UPF, based on a capability requirement. In an example, the SMF may determine an identifier of the UPF. In an example, the SMF may receive from the UPF, a second response message indicating an acceptance for configuration of the second session. The SMF may send to the AMF, a first response message indicating an acceptance for configuration of the first session. In an example, the SMF may receive from the UPF, a first acknowledgment message indicating an acknowledgment for the receipt of the uplink data via the second session. The SMF may send to the AMF, a second acknowledgment message indicating an acknowledgment for the receipt of the uplink data via the first session. In an example, the AMF may receive from the wireless device, a first non-access stratum (NAS) message indicating a request for data transmission over control plane. The first NAS message may comprise the uplink data. The SMF may receive from the UPF, a third message indicating a request to configure a third session for transmission of downlink data. The third message may comprise an identifier of the third session. The SMF may send to the AMF a fourth message indicating a request to configure a fourth session for transmission of downlink data. The fourth message may comprise an identifier of the fourth session.

In an example, the SMF may receive from the UPF, the downlink data. The SMF may send to the AMF, the downlink data. In an example, the SMF may receive from the UPF, a downlink data notification. The SMF may send to the AMF, the downlink data notification. The AMF may send to a base station and in response to receiving the downlink data notification, a paging request for the wireless device (the UE). The AMF may send to the wireless device, the downlink data via a non access stratum (NAS) message. In an example, the identifier of the third session may be the identifier of the second session. In an example, the identifier of the fourth session may be the identifier of the first session.

In an example, the AMF may receive from the wireless device, a request to establish a non-access stratum (NAS) connection via a base station, the request indicating that the NAS connection is for data transmission over control plane. In an example, the AMF may receive from the wireless device, a NAS message. The NAS message may comprise uplink data, the indicator for control plane data transmission, and/or the like.

In an example, the SMF may receive from the wireless device, a second NAS message indicating a request for data transmission over control plane. The second NAS message may comprise the uplink data.

In an example embodiment, a session management function (SMF) may receive from a user plane function (UPF), a first message indicating a request for establishment of a first session for transmission of downlink data. The first message may comprise an identifier of the first session, and/or the like. The SMF may send to an access and mobility management function (AMF) a second message indicating a request for establishment of a second session for transmission of downlink data, the second message comprising an identifier of the second session. The SMF may receive from the UPF, the downlink data. The SMF may send to the AMF, the downlink data.

In an example, the first message may comprise at least one of an identifier of the UPF, an address of the UPF, and/or the like. The first message may comprise at least one of an identifier of the SMF, an address of the SMF, and/or the like. In an example, the second message may comprise at least one of an identifier of the SMF, an address of the SMF, and/or the like. In an example, the second message may comprise at least one of an identifier of the AMF, an address of the AMF, and/or the like. In an example, the UPF may send to the SMF, a downlink data notification. The SMF may send to the AMF, the downlink data notification. In an example, the AMF may send to a base station and in response to receiving the downlink data notification, a paging request for the wireless device. The SMF may send to the UPF, a first response message indicating an acceptance for establishment of the first session. The SMF may receive from the AMF, a second response message indicating an acceptance for establishment of the second session. In an example, the SMF may send to the UPF, a first acknowledgment message indicating an acknowledgment for the receipt of the downlink data via the first session. In an example, the SMF may receive from the AMF, a second acknowledgment message indicating an acknowledgment for the receipt of the downlink data via the second session. In an example, the AMF may send to the wireless device, a first non-access stratum (NAS) message comprising the downlink data. In an example, the SMF may receive from the AMF, a third message indicating a request to configure a third session for a wireless device between the SMF and the AMF. The third message may comprise an identifier of the third session, an indicator for control plane data transmission, and/or the like. In an example, the SMF may select a user plane function (UPF) in response to receiving the third message. The SMF may send to the UPF, a fourth message indicating a request to configure a fourth session between the SMF and the UPF. The fourth message may comprise an identifier of the fourth session, the indicator for control plane data transmission, and/or the like.

The SMF may receive from the AMF, uplink data via the third session. The SMF may send to the UPF, the uplink data via the fourth session. In an example, the AMF may receive from the wireless device, the uplink data via a non access stratum (NAS) message. In an example, the identifier of the third session may be the identifier of the second session, and the identifier of the fourth session may be the identifier of the first session. In an example, the AMF may receive from the wireless device, a request to establish a non-access stratum (NAS) connection via a base station. In an example, the request may indicate that the NAS connection is for data transmission over control plane. In an example, the AMF may receive from the wireless device, a NAS message. The NAS message may comprise uplink data, the indicator for control plane data transmission, and/or the like. In an example, the SMF may receive from the wireless device, a second NAS message indicating a request for data transmission over control plane. The second NAS message may be a session management NAS message (e.g. SM-NAS, NAS SM, and/or the like). In an example, the second NAS message may comprise the uplink data.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 17:
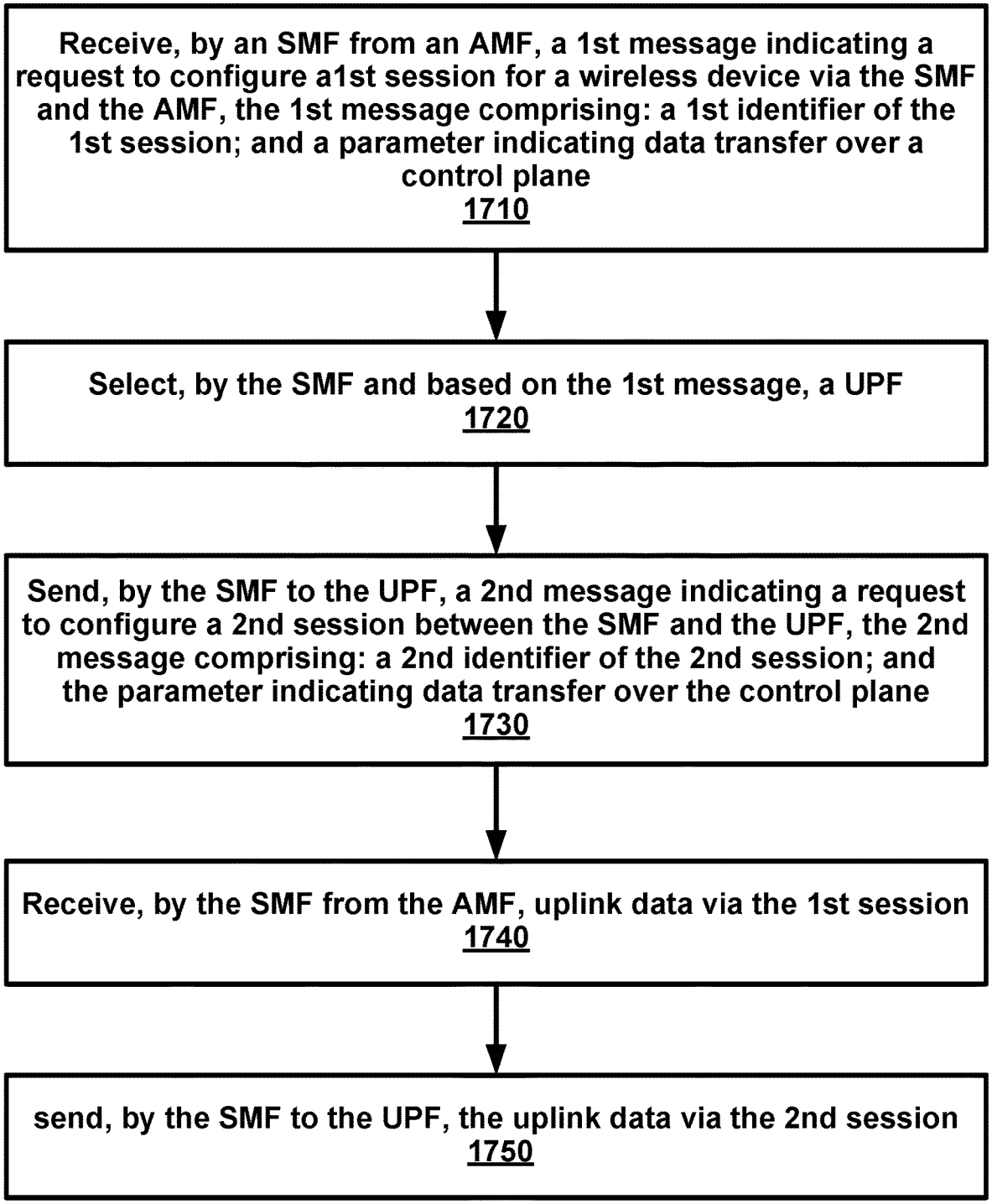
FIG. 17 is an example flow diagram illustrating an aspect of an embodiment of the disclosure.

FIG. 17 is a flow diagram of an aspect of an embodiment of the present disclosure. At 1710, a session management function (SMF) may receive a first message from an access and mobility management function (AMF). The first message may indicate a request to configure a first session for a wireless device via the SMF and the AMF. The first message may comprise a first identifier of the first session. The first message may comprise a parameter indicating a data transfer over a control plane. At 1720, the SMF may select, based on the first message, a user plane function (UPF). At 1730, the SMF may send a second message to the UPF. The second message may indicate a request to configure a second session between the SMF and the UPF. The second message may comprise a second identifier of the second session. The second message may comprise the parameter. The parameter may indicate a data transfer over a control plane. At 1740, the SMF may receive uplink data from the AMF via the first session. At 1750, the SMF may send the uplink data to the UPF via the second session.

According to an example embodiment, the first message may comprise an identifier of the SMF. According to an example embodiment, the first message may comprise an address of the SMF. According to an example embodiment, the first message may comprise an identifier of the AMF. According to an example embodiment, the first message may comprise an address of the AMF. According to an example embodiment, the second message may comprise an identifier of the SMF. According to an example embodiment, the second message may comprise an address of the SMF. According to an example embodiment, the second message may comprise an identifier of the UPF. According to an example embodiment, the second message may comprise an address of the UPF. According to an example embodiment, the SMF may select the UPF based on a capability requirement and determine an identifier of the UPF. According to an example embodiment, the SMF may receive a second response message from the UPF. The second response message may indicate an acceptance for configuration of the second session. According to an example embodiment, the SMF may send a first response message to the AMF. The first response message may indicate an acceptance for configuration of the first session. According to an example embodiment, the SMF may receive a first acknowledgment message from the UPF. The first acknowledgment message may indicate receipt of the uplink data via the second session. According to an example embodiment, the SMF may send a second acknowledgment message to the AMF. The second acknowledgment message may indicate receipt of the uplink data via the first session.

According to an example embodiment, the AMF may receive a first non-access stratum (NAS) message from the wireless device, The first NAS message may indicate a request for data transmission over control plane. According to an example embodiment, the first NAS message may comprise the uplink data.

According to an example embodiment, the SMF may receive a third message from the UPF. The third message may indicate a request to configure a third session for transmission of downlink data. The third message may comprise an identifier of the third session. According to an example embodiment, the SMF may send a fourth message to the AMF. The fourth message may indicate a request to configure a fourth session for transmission of the downlink data. The fourth message may comprise an identifier of the fourth session. According to an example embodiment, the SMF may receive the downlink data from the UPF. According to an example embodiment, the SMF may send the downlink data to the AMF. According to an example embodiment, the SMF may receive a downlink data notification from the UPF. According to an example embodiment, the SMF may send the downlink data notification to the AMF. According to an example embodiment, the AMF may send paging request for the wireless device to a base station in response to receiving the downlink data notification. According to an example embodiment, the AMF may send the downlink data to the wireless device via a non access stratum (NAS) message. According to an example embodiment, the identifier of the third session may be the identifier of the second session. According to an example embodiment, the identifier of the fourth session may be the identifier of the first session.

According to an example embodiment, the AMF may receive a request to establish a non-access stratum (NAS) connection via a base station from the wireless device. The request may indicate that the NAS connection is for data transmission over control plane. According to an example embodiment, the AMF may receive a NAS message from the wireless device. The NAS message may comprise uplink data. The NAS message may comprise an indicator for data transmission over the control plane. According to an example embodiment, the SMF may receive a second NAS message from the wireless device. The second NAS message may indicate a request for data transmission over control plane. According to an example embodiment, the second NAS message may comprise the uplink data.

FIG. 18 is a flow diagram of an aspect of an embodiment of the present disclosure. At 1810, a session management function (SMF) may receive a first message from a user plane function (UPF). The first message may indicate a request for establishment of a first session for transmission of downlink data for a wireless device. The first message may comprise an identifier of the first session. At 1820, the SMF may send a second message to an access and mobility management function (AMF). The second message may indicate a request for establishment of a second session for transmission of the downlink data. The second message may comprise an identifier of the second session. At 1830, the SMF may receive the downlink data from the UPF. At 1840, the SMF may send the downlink data to the AMF.

According to an example embodiment, the first message may comprise an identifier of the UPF. According to an example embodiment, the first message may comprise n address of the UPF. According to an example embodiment, the first message may comprise an identifier of the SMF. According to an example embodiment, the first message may comprise an address of the SMF. According to an example embodiment, the first message may comprise an identifier of the SMF. According to an example embodiment, the first message may comprise an address of the SMF. According to an example embodiment, the first message may comprise an identifier of the AMF. According to an example embodiment, the first message may comprise an address of the AMF. According to an example embodiment, the UPF may send a downlink data notification to the SMF. According to an example embodiment, the SMF may send a downlink data notification to the AMF. According to an example embodiment, the AMF may send a paging request for the wireless device to a base station in response to receiving the downlink data notification.

According to an example embodiment, the SMF may send a first response message to the UPF. The first response message may indicate an acceptance for establishment of the first session. According to an example embodiment, the SMF may receive a second response message from the AMF. The second response message may indicate an acceptance for establishment of the second session. According to an example embodiment, the SMF may send a first acknowledgment message to the UPF. The first acknowledgment message may indicate receipt of the downlink data via the first session. According to an example embodiment, the SMF may receive a second acknowledgment message from the AMF. The second acknowledgment message may indicate receipt of the downlink data via the second session. According to an example embodiment, the AMF may send a first non-access stratum (NAS) message to the wireless device. The first non-access stratum (NAS) message may comprise the downlink data. According to an example embodiment, the AMF may receive from the wireless device, a request to establish a non-access stratum (NAS) connection via a base station. The request may indicate that the NAS connection is for data transmission over control plane.

According to an example embodiment, the SMF may receive a third message from the AMF. The third message may indicate a request to configure a third session for the wireless device between the SMF and the AMF. The third message may comprise an identifier of the third session. The third message may comprise an indicator for control plane data transmission. According to an example embodiment, the SMF may select a user plane function (UPF) in response to receiving the third message. According to an example embodiment, the SMF may send a fourth message to the UPF. The fourth message may indicate a request to configure a fourth session between the SMF and the UPF. The fourth message may comprise an identifier of the fourth session. The fourth message may comprise the indicator for control plane data transmission. According to an example embodiment, the SMF may receive uplink data from the AMF via the third session. According to an example embodiment, the SMF may send the uplink data to the UPF via the fourth session. According to an example embodiment, the AMF may receive uplink data by the wireless device via a non access stratum (NAS) message. According to an example embodiment, the identifier of the third session may be the identifier of the second session. According to an example embodiment, the identifier of the fourth session may be the identifier of the first session. According to an example embodiment, the AMF may receive a NAS message from the wireless device. The NAS message may comprise: uplink data; and the indicator for control plane data transmission. According to an example embodiment, the SMF may receive a second NAS message from the wireless device. The second NAS message may indicate a request for data transmission over control plane. The second NAS message may be a session management NAS message. According to an example embodiment, the second NAS message may comprise the uplink data.

FIG. 19 is a flow diagram of an aspect of an embodiment of the present disclosure. At 1910, an access and mobility management function (AMF) may receive from a wireless device, a request to establish a non-access stratum (NAS) connection via a base station. The request may indicate that the NAS connection is for data transmission over control plane. At 1920, the AMF may receive a NAS message from the wireless device. The NAS message may comprise uplink data. The NAS message may comprise an indicator for control plane data transmission. At 1930, the AMF may select a network exposure function (NEF) in response to receiving the NAS message. At 1940, the AMF may send a first message to the NEF. The first message may indicate a request to configure a first session for the wireless device between the AMF and the NEF. The first message may comprise the indicator for control plane data transmission. The first message may comprise an identifier of the NEF. At 1950, the AMF may send the uplink data to the NEF via the first session.

According to an example embodiment, the first message may comprise an identifier of the first session. According to an example embodiment, the first message may comprise a serving PLMN rate control. According to an example embodiment, the first message may comprise an PLMN rate control. According to an example embodiment, the first message may comprise an access point name (APN). According to an example embodiment, the first message may comprise a data network name (DNN). According to an example embodiment, the first message may comprise a protocol configuration option (PCO). According to an example embodiment, the first message may comprise an identifier of the wireless device. According to an example embodiment, the NEF may send, the uplink data to an application server (AS). According to an example embodiment, the NEF may receive, downlink data from the AS. According to an example embodiment, the NEF may send the downlink data by to the AMF. According to an example embodiment, the AMF may send to the wireless device, the downlink data over a non access stratum (NAS) message via a base station.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this disclosure and the claims, differentiating terms like "first," "second," "third," identify separate elements without implying an ordering of the elements or functionality of the elements. Differentiating terms may be replaced with other differentiating terms when describing an embodiment.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   receiving, by a session management function (SMF) from an access and mobility management function (AMF), a first message indicating a request to configure a first session for a wireless device, the first message comprising:
      a first identifier of the first session; and
      a cellular internet-of-things (IoT) optimization indication parameter indicating transfer of uplink data for cellular IoT over a control plane;
   selecting, by the SMF and based on the first message, a user plane function (UPF);
   sending, by the SMF to the UPF, a second message indicating a request to configure a second session between the SMF and the UPF, the second message comprising a second identifier of the second session;
   receiving, by the SMF from the AMF, the uplink data for cellular IoT via the first session; and
   sending, by the SMF to the UPF, the uplink data for cellular IoT via the second session.

2. The method of claim 1, wherein the first message comprises at least one of:
   an identifier of the SMF; and
   an address of the SMF.

3. The method of claim 1, wherein the first message comprises at least one of:
   an identifier of the AMF; and
   an address of the AMF.

4. The method of claim 1, wherein the second message comprises at least one of:
   an identifier of the SMF; and
   an address of the SMF.

5. The method of claim 1, wherein the second message comprises at least one of:
   an identifier of the UPF; and
   an address of the UPF.

6. The method of claim 1, further comprising:
   selecting, by the SMF, the UPF, based on a capability requirement; and
   determining an identifier of the UPF.

7. The method of claim 1, further comprising:
   receiving by the SMF from the UPF, a second response message indicating an acceptance for configuration of the second session; and
   sending by the SMF to the AMF, a first response message indicating an acceptance for configuration of the first session.

8. The method of claim 1, further comprising:
   receiving, by the SMF from the UPF, a first acknowledgment message indicating receipt of the uplink data via the second session; and
   sending by the SMF to the AMF, a second acknowledgment message indicating receipt of the uplink data via the first session.

9. The method of claim 1, further comprising receiving by the AMF from the wireless device, a first non-access stratum (NAS) message indicating a request for data transmission over the control plane.

10. The method of claim 9, wherein the first NAS message comprises the uplink data.

11. The method of claim 1, further comprising:
    receiving, by the SMF from the UPF, a third message indicating a request to configure a third session for transmission of downlink data, the third message comprising an identifier of the third session; and sending, by the SMF to the AMF a fourth message indicating a request to configure a fourth session for transmission of the downlink data, the fourth message comprising an identifier of the fourth session.

12. The method of claim 11, further comprising:
receiving, by the SMF from the UPF, the downlink data; and
sending, by the SMF to the AMF, the downlink data.

13. The method of claim 12, further comprising:
receiving, by the SMF from the UPF, a downlink data notification;
sending, by the SMF to the AMF, the downlink data notification; and
sending, by the AMF to a base station and in response to receiving the downlink data notification, a paging request for the wireless device.

14. The method of claim 12, further comprising sending by the AMF to the wireless device, the downlink data via a non access stratum (NAS) message.

15. The method of claim 11, wherein the identifier of the third session is the identifier of the second session.

16. The method of claim 11, wherein the identifier of the fourth session is the identifier of the first session.

17. The method of claim 1, further comprising:
receiving, by the AMF from the wireless device, a request to establish a non-access stratum (NAS) connection via a base station, the request indicating that the NAS connection is for data transmission over the control plane.

18. The method of claim 17, further comprising receiving, by the AMF from the wireless device, a NAS message comprising:
uplink data; and
an indicator for data transmission over the control plane.

19. The method of claim 1, further comprising receiving by the SMF from the wireless device, a second NAS message indicating a request for data transmission over the control plane.

20. The method of claim 19, wherein the second NAS message comprises the uplink data.

* * * * *